US012055372B1

(12) United States Patent
Mortensen

(10) Patent No.: US 12,055,372 B1
(45) Date of Patent: Aug. 6, 2024

(54) LOADING SYSTEM FOR AN AMMUNITION CASE GAUGE AND METHOD FOR LOADING AMMUNITION CARTRIDGES INTO THE AMMUNITION CASE GAUGE

(71) Applicant: GS Machines LLC, Clarkston, MI (US)

(72) Inventor: Gene Mortensen, Clarkston, MI (US)

(73) Assignee: GS Machines LLC, Clarkston, MI (US)

( * ) Notice: Subject to any disclaimer, the term of this patent is extended or adjusted under 35 U.S.C. 154(b) by 69 days.

(21) Appl. No.: 18/111,674

(22) Filed: Feb. 20, 2023

Related U.S. Application Data

(60) Provisional application No. 63/317,680, filed on Mar. 8, 2022.

(51) Int. Cl.
| | | |
|---|---|---|
| *F42B 35/02* | (2006.01) | |
| *B65G 27/04* | (2006.01) | |
| *F42B 3/10* | (2006.01) | |
| *F42B 33/00* | (2006.01) | |
| *F42B 33/10* | (2006.01) | |

(52) U.S. Cl.
CPC .............. *F42B 35/02* (2013.01); *B65G 27/04* (2013.01); *B65G 2201/047* (2013.01); *F42B 33/002* (2013.01); *F42B 33/10* (2013.01)

(58) Field of Classification Search
CPC ...... F42B 33/00; F42B 33/001; F42B 33/002; F42B 33/10; F42B 33/14; F42B 35/00; F42B 35/02; B65G 27/04

USPC ........................................ 86/19.5, 23, 24, 28
See application file for complete search history.

(56) References Cited

U.S. PATENT DOCUMENTS

| | | | | |
|---|---|---|---|---|
| 3,704,504 A | * | 12/1972 | Koegler ............... | H05K 13/028 |
| | | | | 29/799 |
| 5,052,167 A | * | 10/1991 | Scharch ................ | B65B 19/34 |
| | | | | 53/448 |
| 5,148,653 A | * | 9/1992 | Scharch ................ | B65B 19/34 |
| | | | | 53/448 |

* cited by examiner

*Primary Examiner* — James S Bergin
(74) *Attorney, Agent, or Firm* — Buckert Patent & Trademark Law Firm PC; John F. Buckert

(57) ABSTRACT

A loading system for an ammunition case gauge is provided. The system includes first and second movable support assemblies that are coupled between a base plate and an upper support plate. The system includes a feeder housing coupled to the upper support plate having an interior region communicating with a top open end thereof and a side opening thereof. The system includes a pusher plate having a bottom wall and a plurality of shafts that receives the case gauge thereon. The system includes a feeder plate that is disposed on the case gauge such that the case gauge is disposed between the pusher plate and the feeder plate. The side opening is sized to receive the pusher plate, the case gauge, and the feeder plate therethrough. The system includes a vibratory motor that vibrates the feeder plate, the case gauge, and the pusher plate.

13 Claims, 34 Drawing Sheets

LOADING SYSTEM FOR AN AMMUNITION CASE GAUGE AND METHOD FOR LOADING AMMUNITION CARTRIDGES INTO THE AMMUNITION CASE GAUGE

CROSS-REFERENCE TO RELATED APPLICATIONS

This application claims priority to U.S. Provisional Patent Application No. 63/317,680 filed on Mar. 8, 2022, the entire contents of which are hereby incorporated by reference herein.

BACKGROUND

Ammunition cartridges that do not meet industry sizing standards can cause a malfunction in a self-loading rifle or handgun. To confirm that the ammunition cartridges are properly sized, a user can utilize an ammunition case gauge which has apertures that are sized and shaped to only accept a specific ammunition cartridge therein meeting an industry sizing standard. In particular, the user manually places the ammunition cartridges in the apertures of the ammunition case gauge to confirm that the cartridges are correctly sized which is a time-consuming process.

The inventor herein has recognized a need for a loading system for an ammunition case gauge that reduces the above-mentioned deficiency.

SUMMARY

A loading system for an ammunition case gauge in accordance with an exemplary embodiment is provided. The ammunition case gauge has a plurality of holes extending therethrough. The loading system includes a base plate and an upper support plate. The loading system further includes first and second movable support assemblies that are coupled to and between the base plate and the upper support plate. The loading system further includes a feeder housing that is coupled to the upper support plate. The feeder housing has an interior region communicating with a top open end thereof and a side opening thereof. The loading system further includes a pusher plate having a bottom wall and a plurality of shafts extending upwardly from the bottom wall. The pusher plate removably receives the ammunition case gauge thereon such that the plurality of shafts extend at least partially into the plurality of holes of the ammunition case gauge. The loading system further includes a feeder plate having a plurality of apertures extending therethrough. The feeder plate is disposed on the ammunition case gauge such that the ammunition case gauge is disposed between the pusher plate and the feeder plate. Each aperture of the plurality of apertures is aligned with a respective hole of the plurality of holes of the ammunition case gauge and is further aligned with a respective shaft of the plurality of shafts of the pusher plate. The side opening is sized to receive the pusher plate, the ammunition case gauge, and the feeder plate therethrough such that the pusher plate, the ammunition case gauge, and the feeder plate are disposed in the interior region of the feeder housing. The loading system further includes a vibratory motor being coupled to the upper support plate such that the vibratory motor vibrates the feeder plate, the ammunition case gauge, and the pusher plate.

A method for loading a plurality of ammunition cartridges into an ammunition case gauge in accordance with another exemplary embodiment is provided. The ammunition case gauge has a plurality of holes extending therethrough. The method includes providing a loading system having a base plate, an upper support plate, first and second movable support assemblies, a feeder housing, a pusher plate, a feeder plate, and a vibratory motor. The first and second movable support assemblies are coupled to and between the base plate and the upper support plate. The feeder housing is coupled to the upper support plate. The feeder housing has an interior region communicating with a top open end thereof and a side opening thereof. The pusher plate has a bottom wall and a plurality of shafts extending upwardly from the bottom wall. The feeder plate has a plurality of apertures extending therethrough. The vibratory motor is coupled to the upper support plate. The method further includes disposing the ammunition case gauge on the pusher plate such that the plurality of shafts extend at least partially into the plurality of holes of the ammunition case gauge. The method further includes disposing the feeder plate on the ammunition case gauge such that the ammunition case gauge is disposed between the pusher plate and the feeder plate, and each aperture of the plurality of apertures is aligned with a respective hole of the plurality of holes of the ammunition case gauge and is further aligned with a respective shaft of the plurality of shafts of the pusher plate. The method further includes disposing the feeder plate, the ammunition case gauge, and the pusher plate through the side opening of the feeder housing and into the interior region. The method further includes disposing the plurality of ammunition cartridges on the feeder plate. The method further includes vibrating the feeder plate, the ammunition case gauge, the pusher plate, and the plurality of ammunition cartridges utilizing the vibratory motor such that the plurality of ammunition cartridges are fed into the plurality of apertures of the feeder plate and into the plurality of holes of the ammunition case gauge in response to a vibrating motion of the vibratory motor.

DETAILED DESCRIPTION

Figure 1:
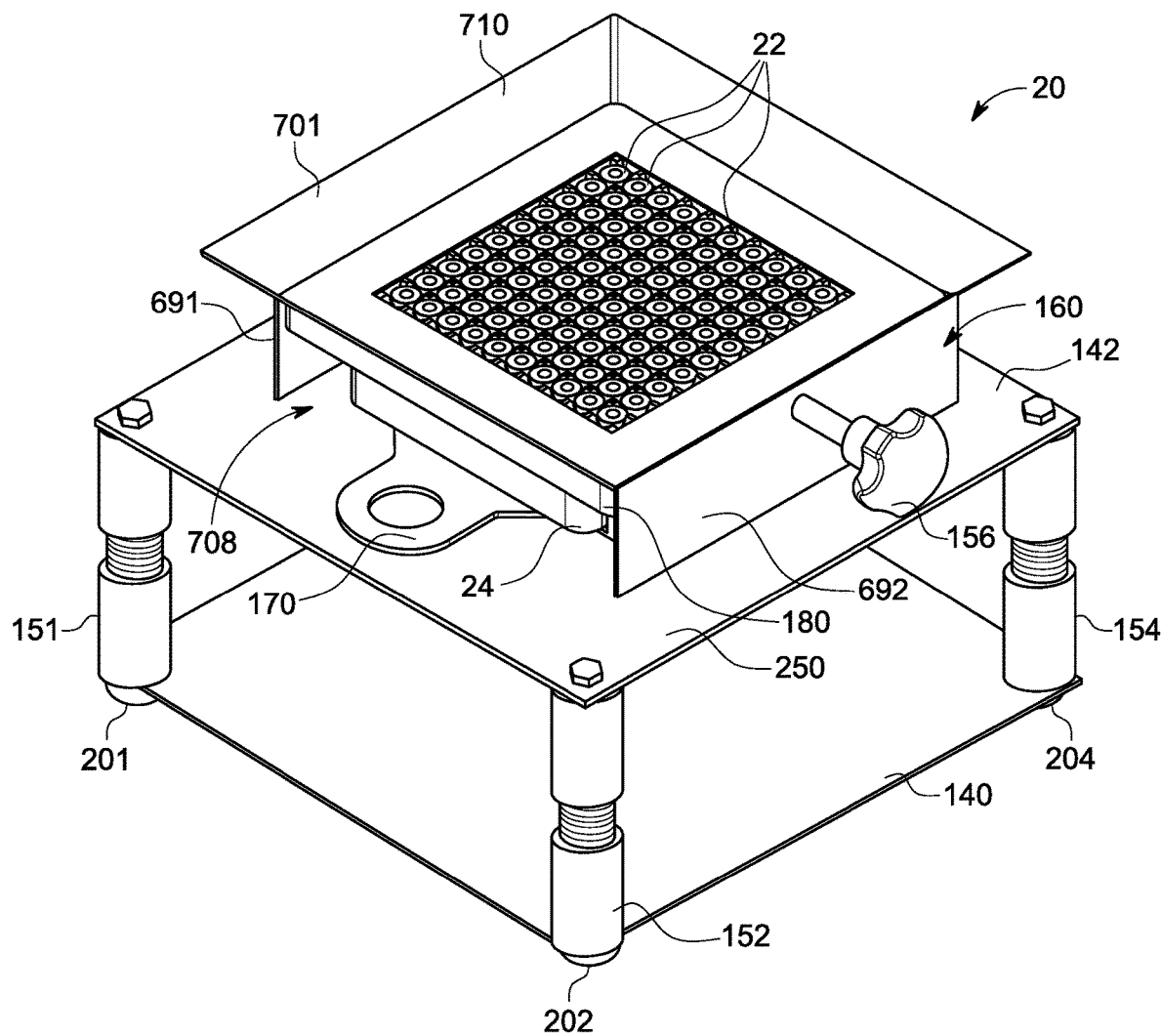
FIG. 1 is an isometric view of a loading system for an ammunition case gauge in accordance with an exemplary embodiment wherein a plurality of ammunition cartridges are disposed in the ammunition cage gauge.
Figure 2:
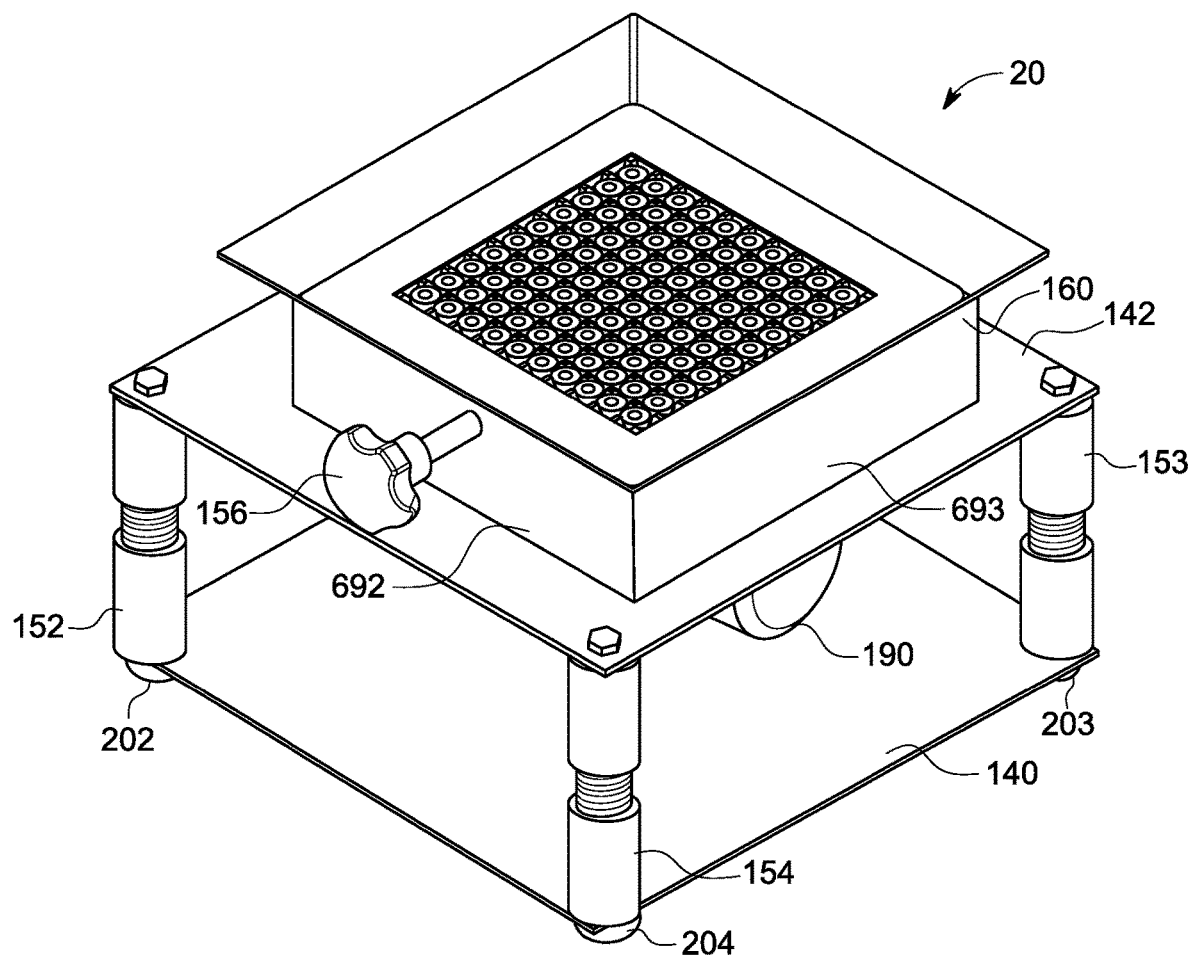
FIG. 2 is another isometric view of the loading system of FIG. 1.

Referring to FIGS. 1-31, a loading system 20 in accordance with an exemplary embodiment is provided. The loading system 20 automatically loads a plurality of ammunition cartridges 22 in an ammunition case gauge 24 (shown in FIG. 11).

Referring to FIG. 11-14, the ammunition case gauge 24 is utilized to verify a correct size of each ammunition cartridge of the plurality of ammunition cartridges 22. In particular, if one of the ammunition cartridges does not meet an ammunition industry sizing standard (e.g., a standard size for a 9 mm ammunition cartridge), the ammunition cartridge will not fit properly within an aperture in the ammunition case gauge 24. The ammunition case gauge 24 includes a base portion 40 and a substantially rectangular-shaped upper portion 42 that is integrally formed with and extends upwardly from the base portion 40. The ammunition case gauge 24 further includes a plurality of holes 44 extending through the substantially rectangular-shaped upper portion 42 and the base portion 40. Further, a diameter of a bottom portion of each hole is smaller than a diameter of an upper portion of each hole such that an ammunition cartridge is received through the upper portion of the hole but will not fall through the bottom portion of the hole. Further, a height of the upper portion of the hole is set to a specific desired height of a specific ammunition cartridge to allow a user to determine whether the ammunition cartridge is a correct length. Thus, a properly sized ammunition cartridge is removably held within a hole of the ammunition case gauge.

The base portion 40 includes first, second, third, fourth side surfaces 51, 52, 53, 54, a top surface 55, and a bottom surface 56. The first and second side surfaces 51, 52 extend substantially parallel to one another. The third and fourth side surfaces 53, 54 extend substantially parallel to one another and perpendicular to the first and second side surfaces 51, 52.

Figure 12:
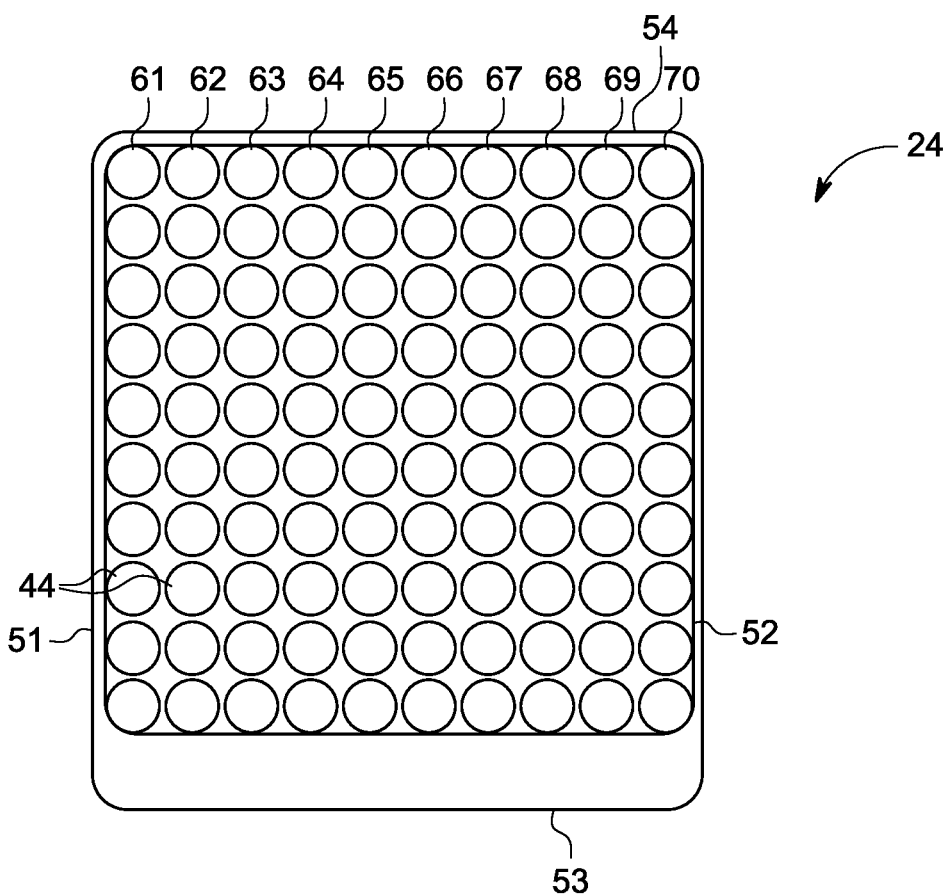
FIG. 12 is a top view of the ammunition case gauge of FIG. 11.
Figure 13:
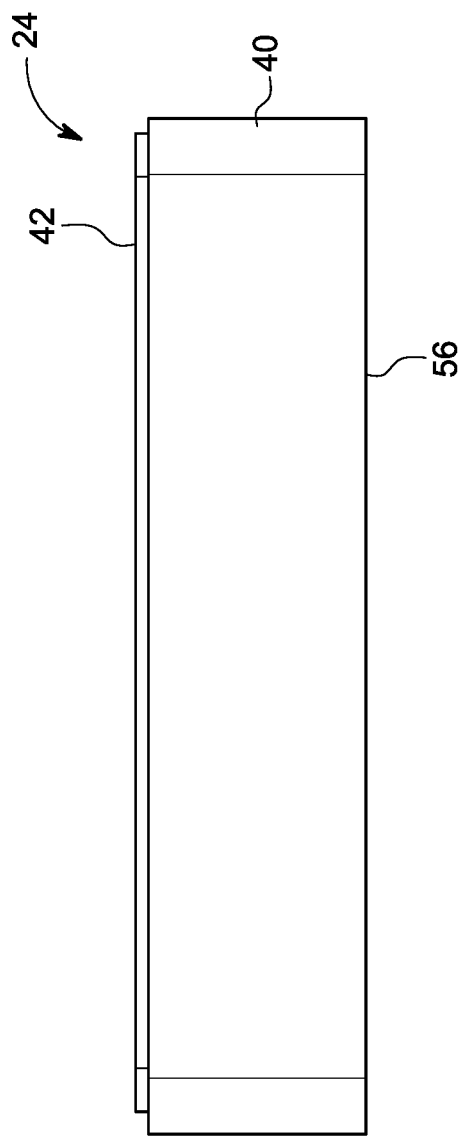
FIG. 13 is a side view of the ammunition case gauge of FIG. 11.
Figure 14:
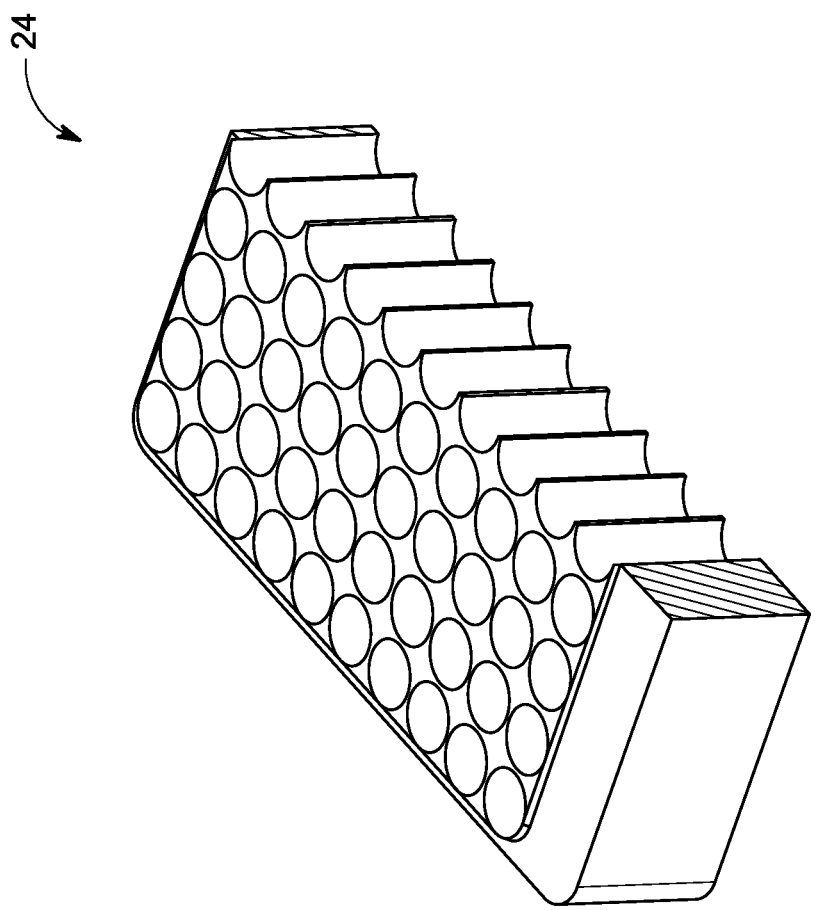
FIG. 14 is a cross-sectional view of the ammunition case gauge of FIG. 11 taken along lines 14-14 in FIG. 11.

Referring to FIG. 12, the plurality of holes 44 includes holes of aperture 61, 62, 63, 64, 65, 66, 67, 68, 69, 70 that extend substantially parallel to one another.

Figure 15:
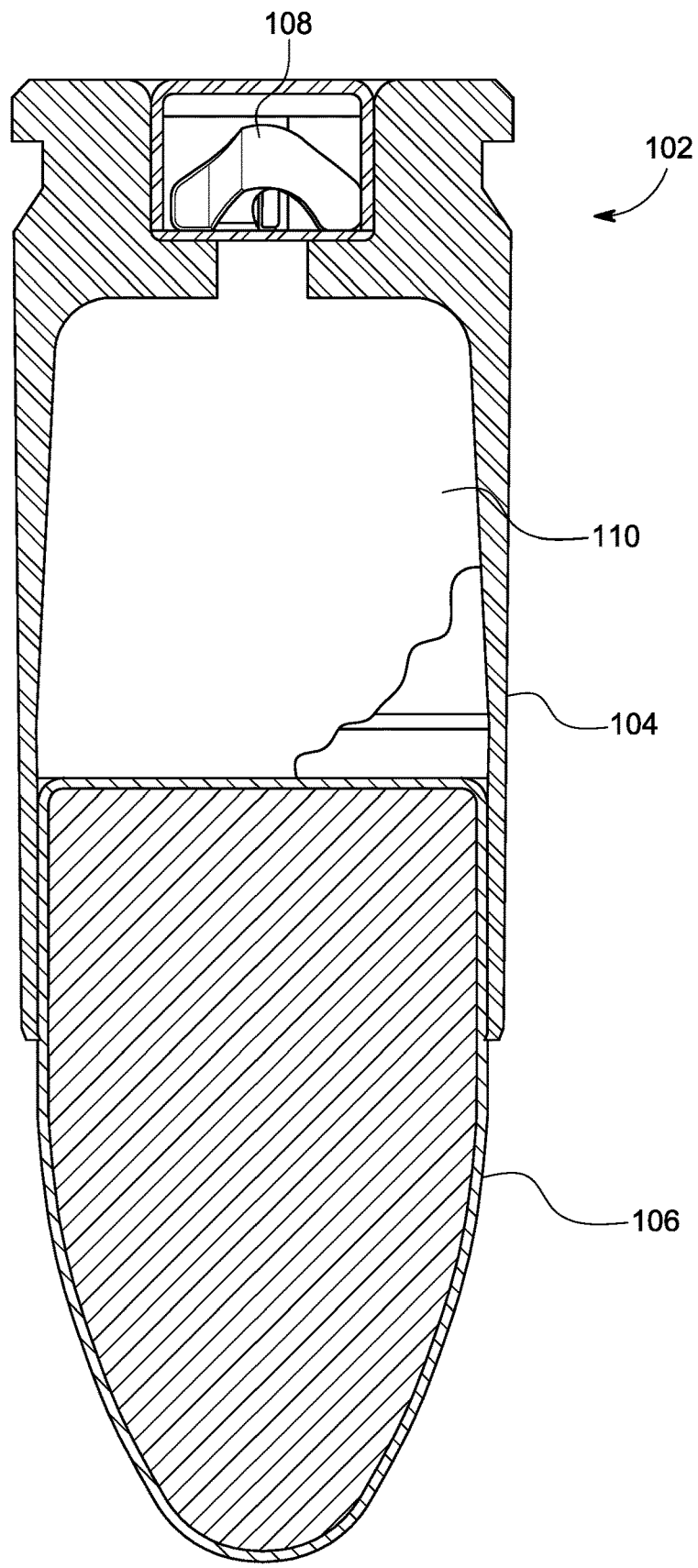
FIG. 15 is a cross-sectional view of an ammunition cartridge.
Figure 16:
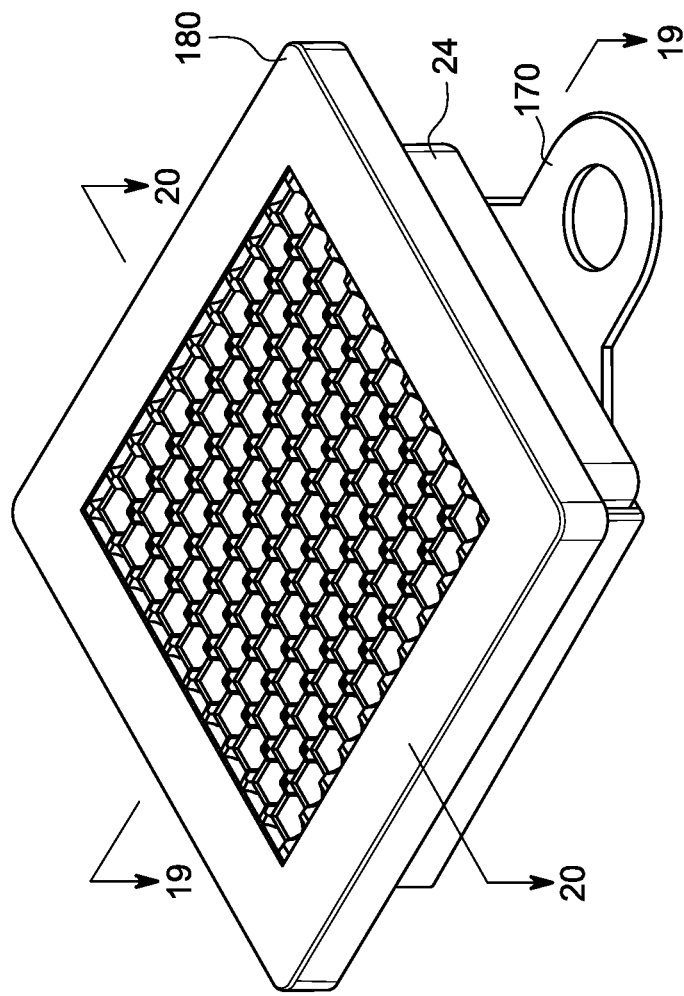
FIG. 16 is an assembled view of a pusher plate and a feeder plate holding an ammunition case gauge therebetween.
Figure 17:
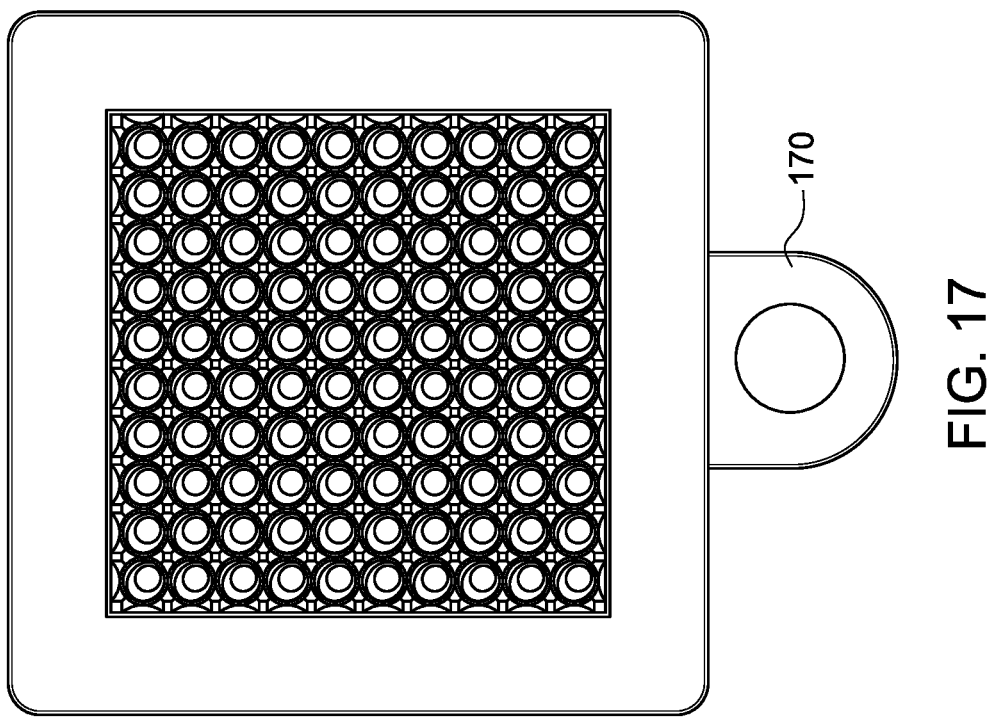
FIG. 17 is a top view of the pusher plate, the feeder plate, and the ammunition case gauge of FIG. 16.
Figure 18:
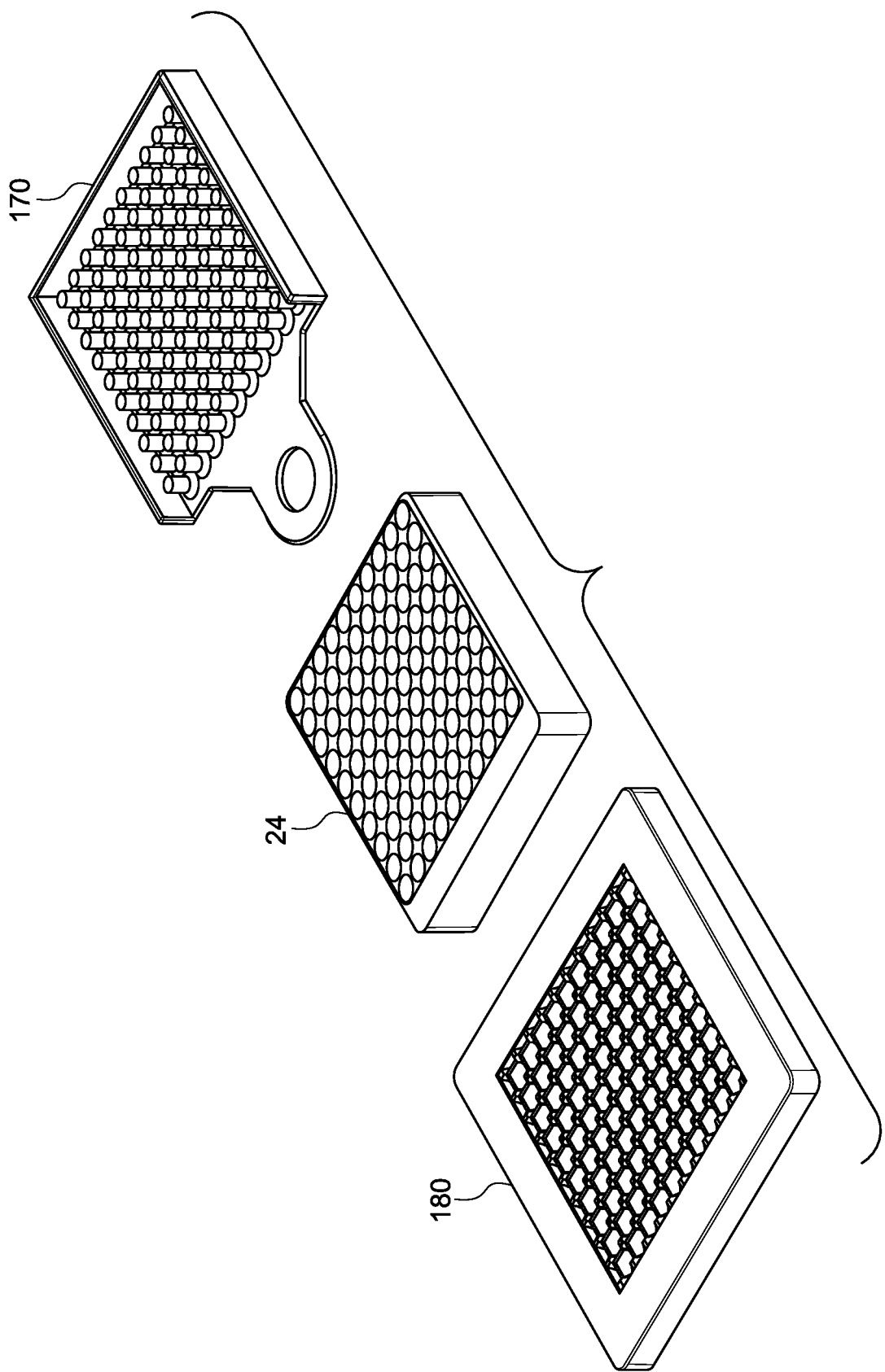
FIG. 18 is an exploded view of the pusher plate, the feeder plate, and the ammunition case gauge of FIG. 16.
Figure 19:
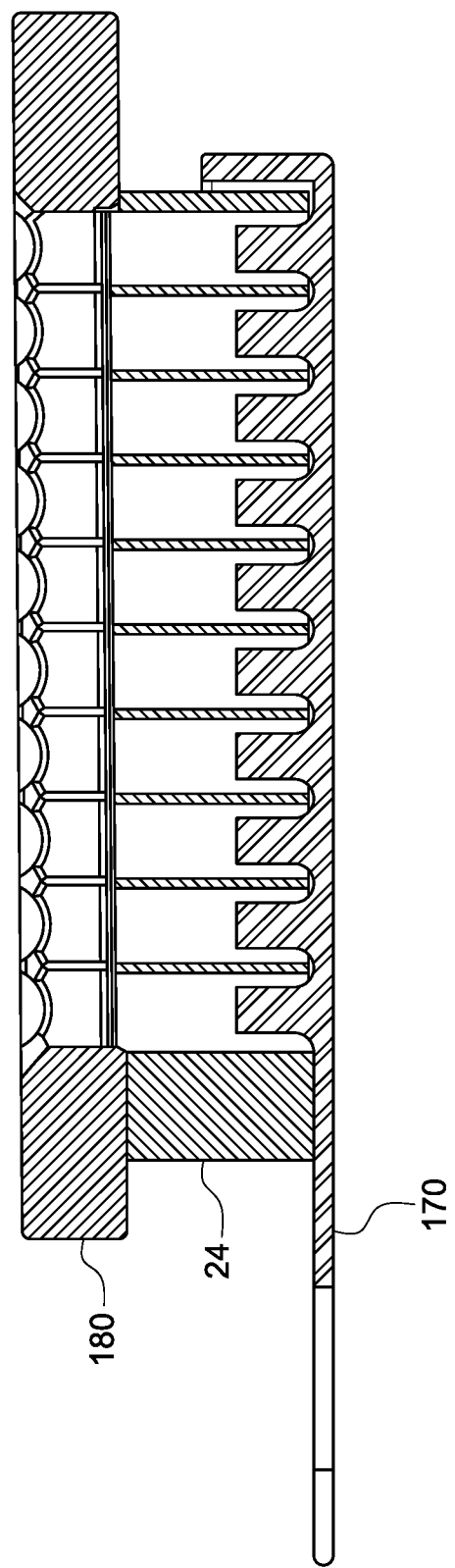
FIG. 19 is a cross-sectional view of the pusher plate, the feeder plate, and the ammunition case gauge of FIG. 16 taken along lines 19-19 in FIG. 16.
Figure 20:
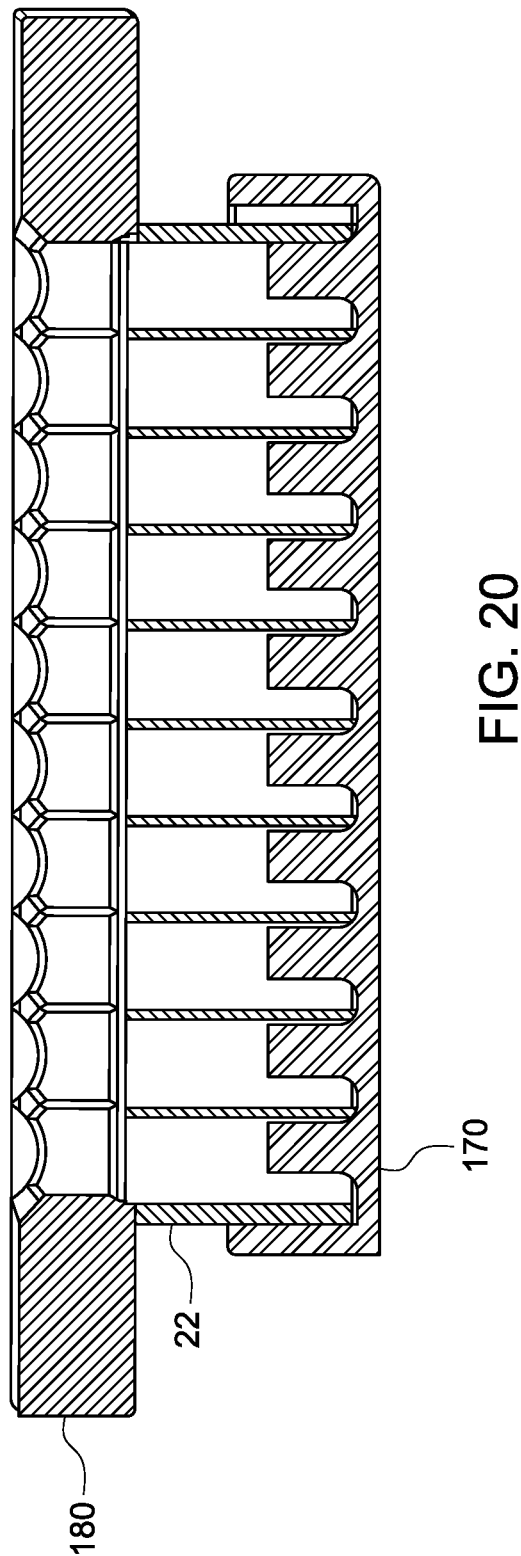
FIG. 20 is a cross-sectional view of the pusher plate, the feeder plate, and the ammunition case gauge of FIG. 16 taken along lines 20-20 in FIG. 16.

Referring to FIGS. 1 and 15, each of the plurality of ammunition cartridges 22 have an identical structure. Accordingly, only the structure of an ammunition cartridge 102 which corresponds to one of the plurality of ammunition cartridges 22 will be explained in detail. The ammunition cartridge 102 includes a casing 104, a bullet 106, a primer 108, and a powder 110. The casing 104 has an interior region that holds the powder 110 therein. The bullet 106 is coupled to a first end of the casing 104, and the primer 108 is coupled to a second end of the casing 104.

Referring to FIGS. 1-10, the loading system 20 in accordance with an exemplary embodiment is illustrated. The loading system 20 includes a base plate 140, an upper support plate 142, a first movable support assembly 151, a second movable support assembly 152, a third movable support assembly 153, a fourth movable support assembly 154, a set screw assembly 156, a feeder housing 160, a pusher plate 170, a feeder plate 180, a vibratory motor 190, and foot pads 201, 202, 203, 204.

Figure 8:
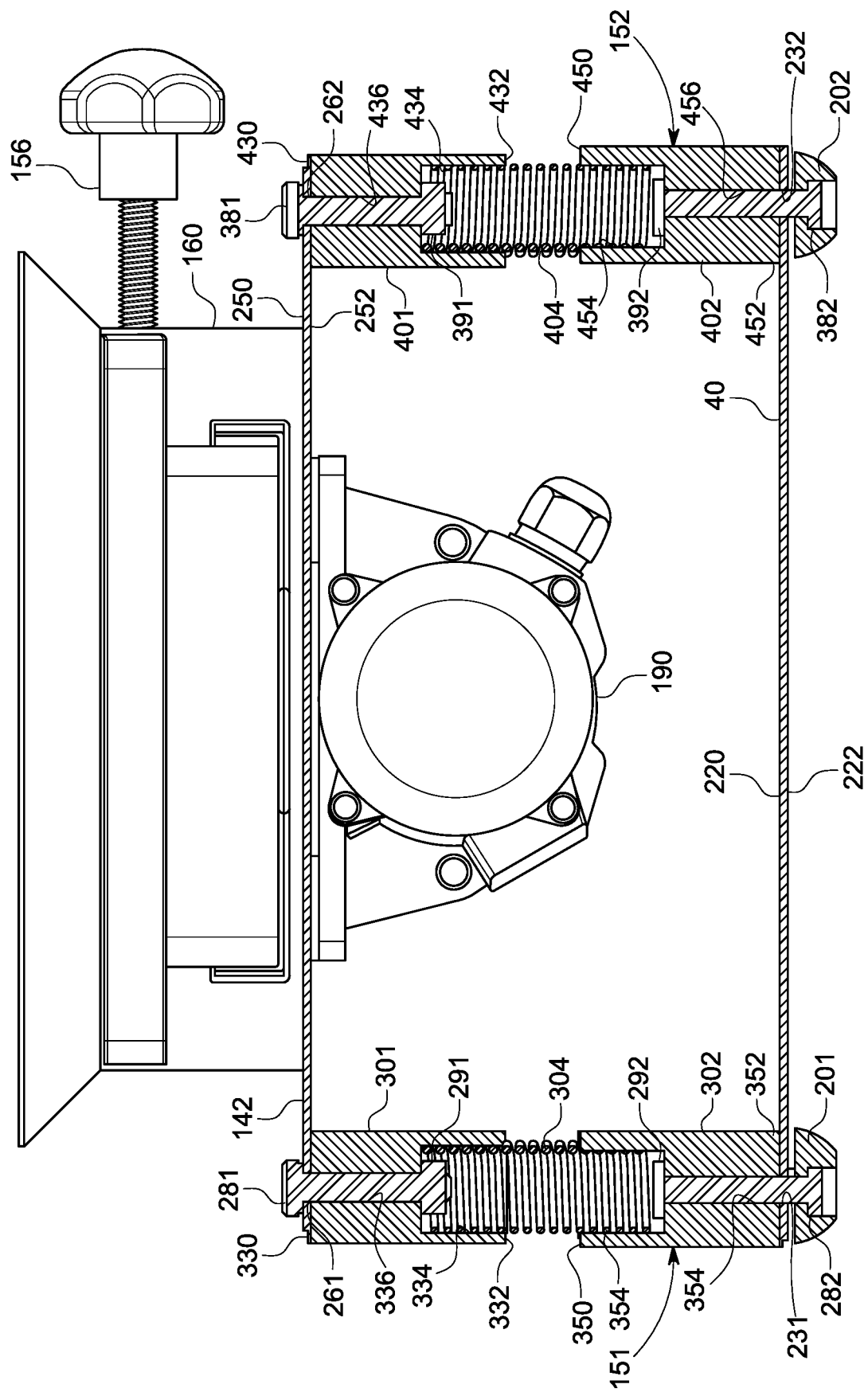
FIG. 8 is a partial cross-sectional view of the loading system of FIG. 3.
Figure 9:
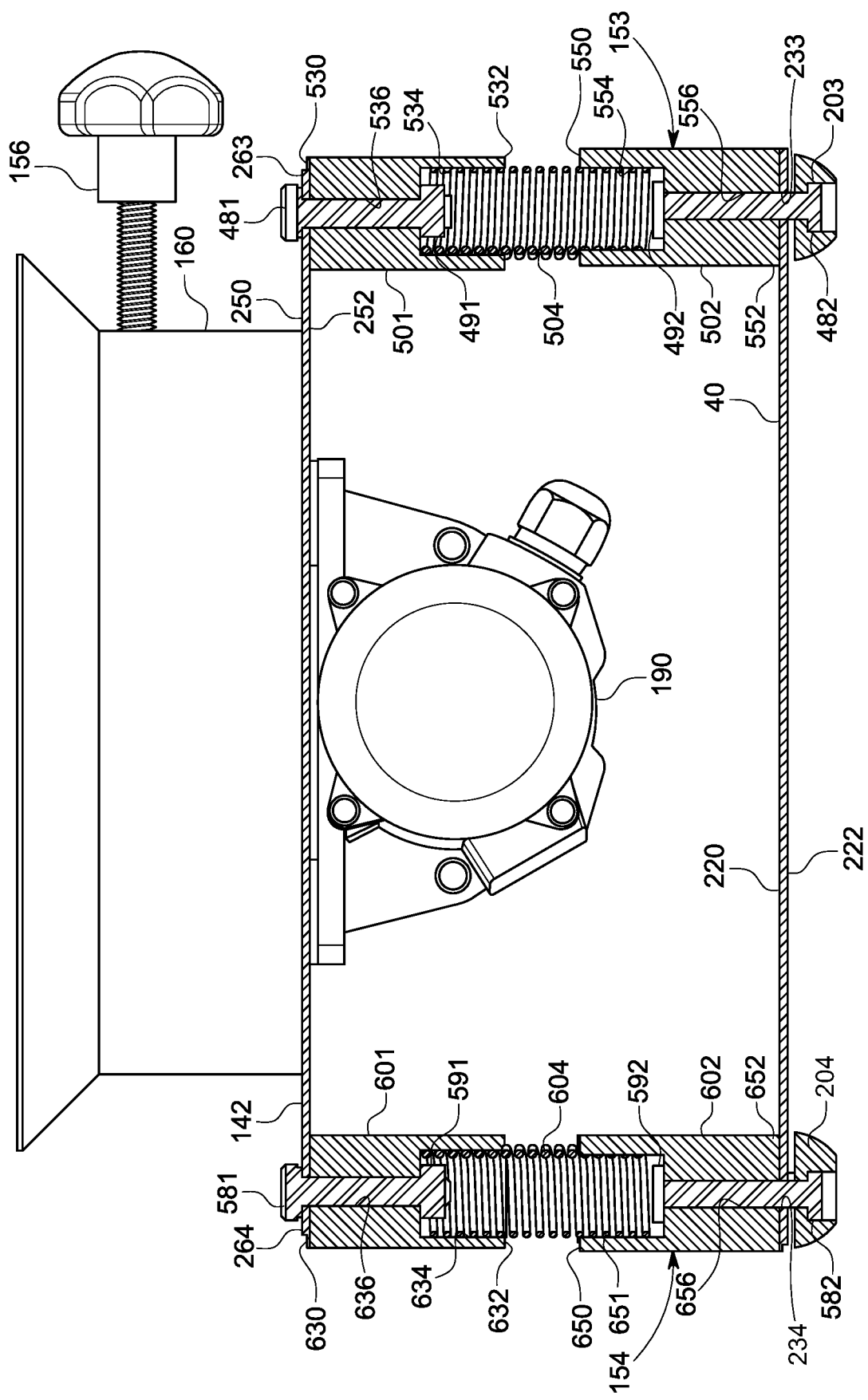
FIG. 9 is another partial cross-sectional view of the loading system of FIG. 3.
Figure 10:
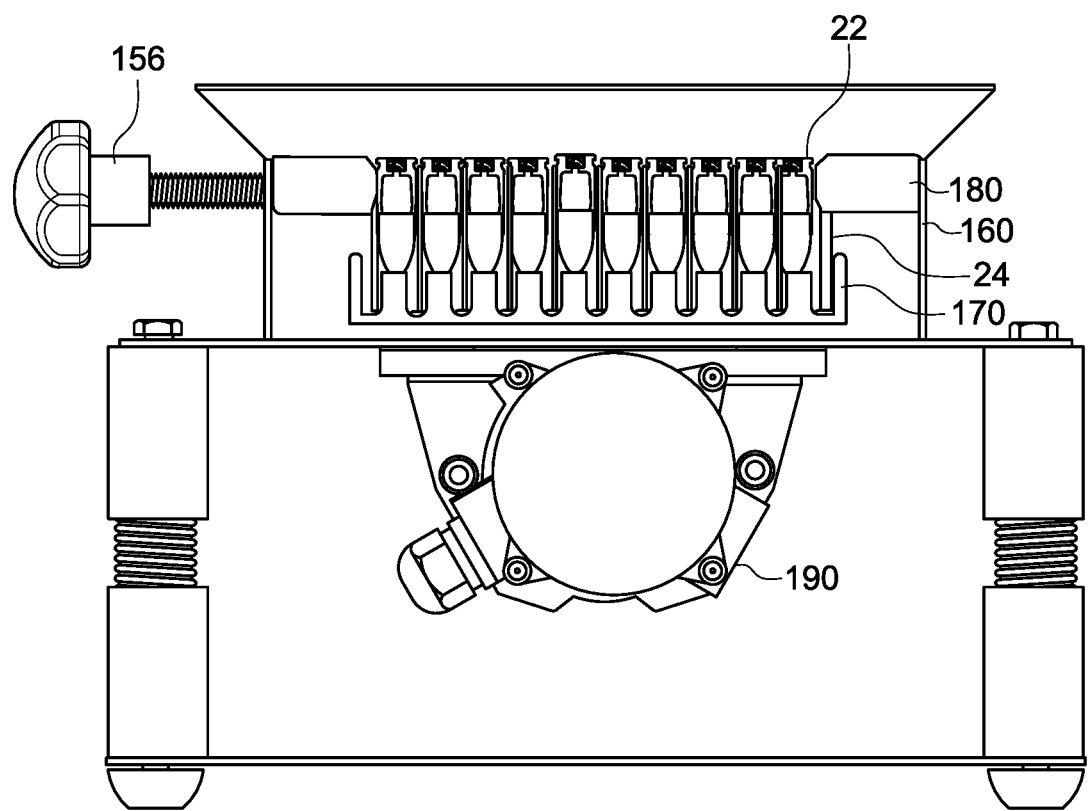
FIG. 10 is a partial cross-sectional view of the loading system of FIG. 1.

Referring to FIGS. 1, 8 and 9, the base plate 40 includes a top surface 220, a bottom surface 222, and apertures 231, 232, 233, 234 extending therethrough. In an exemplary embodiment, the base plate 40 is constructed of a metal such as steel.

The upper support plate 142 includes a top surface 250, a bottom surface 252, and apertures 261, 262, 263, 264 extending therethrough. In an exemplary embodiment, the upper support plate 142 is constructed of a metal such as steel.

Referring to FIG. 8, the first movable support assembly 151 is provided to allow movement of the upper support plate 142 and the feeder housing 160 relative to the base plate 40. The first movable support assembly 151 is coupled to and between the base plate 40 and the upper support plate 142. The first movable support assembly 151 has a first bolt 281, a second bolt 282, a first nut 291, a second nut 292, a first support member 301, a second support member 302, and a spring 304.

The first support member 301 has a top end 330 and a bottom end 332. The first support member 301 further includes a spring receiving aperture 334 extending from the bottom end 332 into the first support member 301. The first support member 301 further includes a bolt receiving aperture 336 extending from the top end 330 into the first support member 301 and communicates with the spring receiving aperture 334.

The first bolt 281 extends through the aperture 261 of the upper support plate 142, and the bolt receiving aperture 336 of the first support member 301, and into the spring receiving aperture 334 of the first support member 301. The first nut 291 is disposed in the spring receiving aperture 334 of the first support member 301 and is threadably coupled to the first bolt 281.

The second support member 302 has a top end 350 and a bottom end 352. The second support member 302 further includes a spring receiving aperture 354 extending from the top end 350 into the second support member 302. The second support member 302 further includes a bolt receiving aperture 356 extending from the bottom end 352 into the second support member 302 and communicating with the spring receiving aperture 354.

The second bolt 282 extends through the aperture 231 of the base plate 40, and the bolt receiving aperture 356 of the second support member 302, and into the spring receiving aperture 354 of the second support member 302. The second nut 292 is disposed in the spring receiving aperture 354 of the second support member 302 and is threadably coupled to the second bolt 282.

The spring 304 is disposed in the spring receiving aperture 334 of the first support member 301 and the spring receiving aperture 354 of the second support member 302 such that the first and second support members 301, 302 are spaced apart from one another.

The second movable support assembly 152 is provided to allow movement of the upper support plate 142 and the feeder housing 160 relative to the base plate 40. The second movable support assembly 152 is coupled to and between the base plate 40 and the upper support plate 142. The second movable support assembly 152 has a first bolt 381, a second bolt 382, a first nut 391, a second nut 392, a first support member 401, a second support member 402, and a spring 404.

The first support member 401 has a top end 430 and a bottom end 432. The first support member 401 further includes a spring receiving aperture 434 extending from the bottom end 432 into the first support member 401. The first support member 401 further includes a bolt receiving aperture 436 extending from the top end 430 into the first support member 401 and communicates with the spring receiving aperture 434.

The first bolt 381 extends through the aperture 262 of the upper support plate 142, and the bolt receiving aperture 436 of the first support member 401, and into the spring receiving aperture 434 of the first support member 401. The first nut 391 is disposed in the spring receiving aperture 434 of the first support member 401 and is threadably coupled to the first bolt 381.

The second support member 402 has a top end 450 and a bottom end 452. The second support member 402 further includes a spring receiving aperture 454 extending from the top end 450 into the second support member 402. The second support member 402 further includes a bolt receiving aperture 456 extending from the bottom end 452 into the second support member 402 and communicating with the spring receiving aperture 454.

The second bolt 382 extends through the aperture 232 of the base plate 40, and the bolt receiving aperture 456 of the second support member 402, and into the spring receiving aperture 454 of the second support member 402. The second nut 392 is disposed in the spring receiving aperture 454 of the second support member 402 and is threadably coupled to the second bolt 382.

The spring 404 is disposed in the spring receiving aperture 434 of the first support member 401 and the spring receiving aperture 454 of the second support member 402 such that the first and second support members 401, 402 are spaced apart from one another.

Referring to FIG. 9, the third movable support assembly 153 is provided to allow movement of the upper support plate 142 and the feeder housing 160 relative to the base plate 40. The third movable support assembly 153 is coupled to and between the base plate 40 and the upper support plate 142. The third movable support assembly 153 has a first bolt 481, a second bolt 482, a first nut 491, a second nut 492, a first support member 501, a second support member 502, and a spring 504.

The first support member 501 has a top end 530 and a bottom end 532. The first support member 501 further includes a spring receiving aperture 534 extending from the bottom end 532 into the first support member 501. The first support member 501 further includes a bolt receiving aperture 536 extending from the top end 530 into the first support member 501 and communicates with the spring receiving aperture 534.

The first bolt 481 extends through the aperture 263 of the upper support plate 142, and the bolt receiving aperture 536 of the first support member 501, and into the spring receiving aperture 534 of the first support member 501. The first nut 491 is disposed in the spring receiving aperture 534 of the first support member 501 and is threadably coupled to the first bolt 481.

The second support member 502 has a top end 550 and a bottom end 552. The second support member 502 further includes a spring receiving aperture 554 extending from the top end 550 into the second support member 502. The second support member 502 further includes a bolt receiving aperture 556 extending from the bottom end 552 into the second support member 502 and communicating with the spring receiving aperture 554.

The second bolt 482 extends through the aperture 233 of the base plate 40, and the bolt receiving aperture 556 of the second support member 502, and into the spring receiving aperture 554 of the second support member 502. The second nut 492 is disposed in the spring receiving aperture 554 of the second support member 502 and is threadably coupled to the second bolt 482.

The spring 504 is disposed in the spring receiving aperture 534 of the first support member 501 and the spring receiving aperture 554 of the second support member 502 such that the first and second support members 501, 502 are spaced apart from one another.

The fourth movable support assembly 154 is provided to allow movement of the upper support plate 142 and the feeder housing 160 relative to the base plate 40. The fourth movable support assembly 154 is coupled to and between the base plate 40 and the upper support plate 142. The fourth movable support assembly 154 has a first bolt 581, a second bolt 582, a first nut 591, a second nut 592, a first support member 601, a second support member 602, and a spring 604.

The first support member 601 has a top end 630 and a bottom end 632. The first support member 601 further includes a spring receiving aperture 634 extending from the bottom end 632 into the first support member 601. The first support member 601 further includes a bolt receiving aperture 636 extending from the top end 630 into the first support member 601 and communicates with the spring receiving aperture 634.

The first bolt 581 extends through the aperture 264 of the upper support plate 142, and the bolt receiving aperture 636 of the first support member 601, and into the spring receiving aperture 634 of the first support member 601. The first nut 591 is disposed in the spring receiving aperture 634 of the first support member 601 and is threadably coupled to the first bolt 581.

The second support member 602 has a top end 650 and a bottom end 652. The second support member 602 further includes a spring receiving aperture 654 extending from the top end 650 into the second support member 602. The second support member 602 further includes a bolt receiving aperture 656 extending from the bottom end 652 into the second support member 602 and communicating with the spring receiving aperture 654.

The second bolt 582 extends through the aperture 234 of the base plate 40, and the bolt receiving aperture 656 of the second support member 602, and into the spring receiving aperture 654 of the second support member 602. The second nut 592 is disposed in the spring receiving aperture 654 of the second support member 602 and is threadably coupled to the second bolt 582.

The spring 604 is disposed in the spring receiving aperture 634 of the first support member 601 and the spring receiving aperture 654 of the second support member 602 such that the first and second support members 601, 602 are spaced apart from one another.

Figure 6:
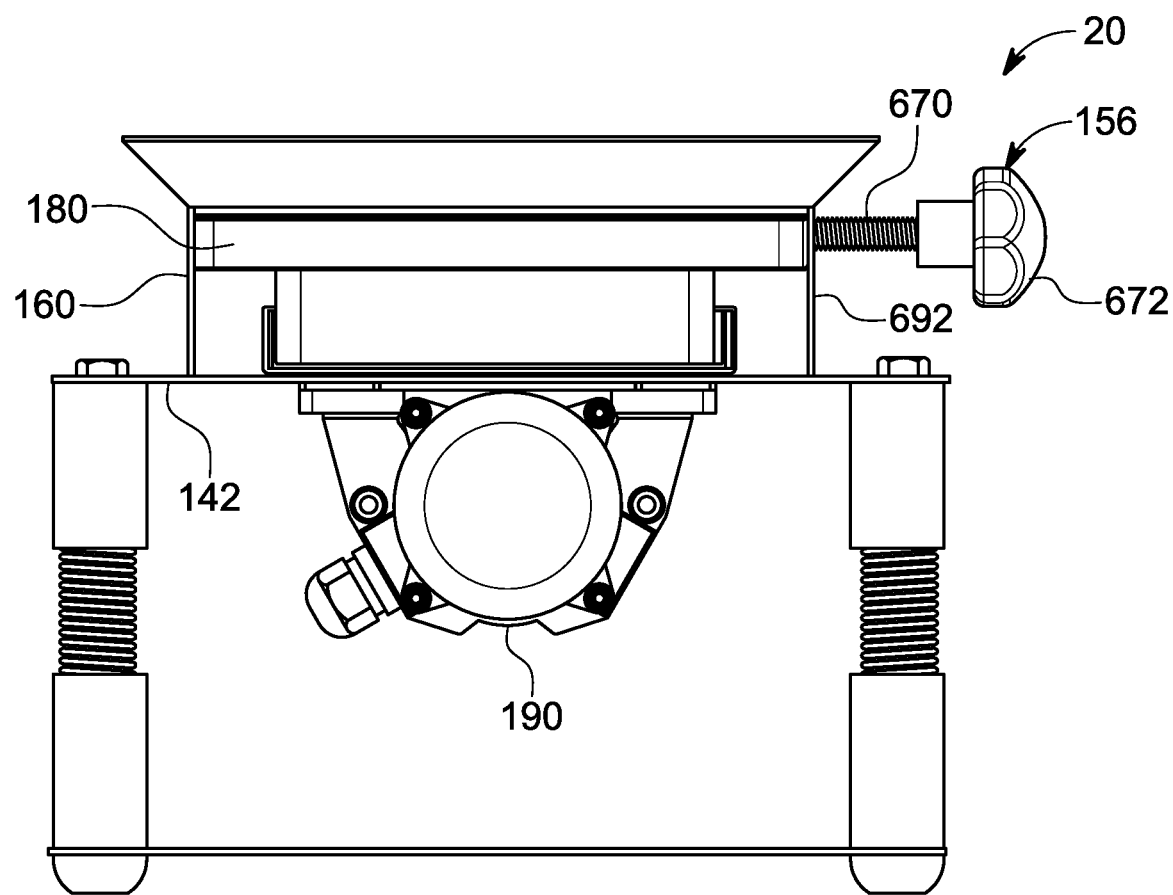
FIG. 6 is a front view of the loading system of FIG. 3.
Figure 7:
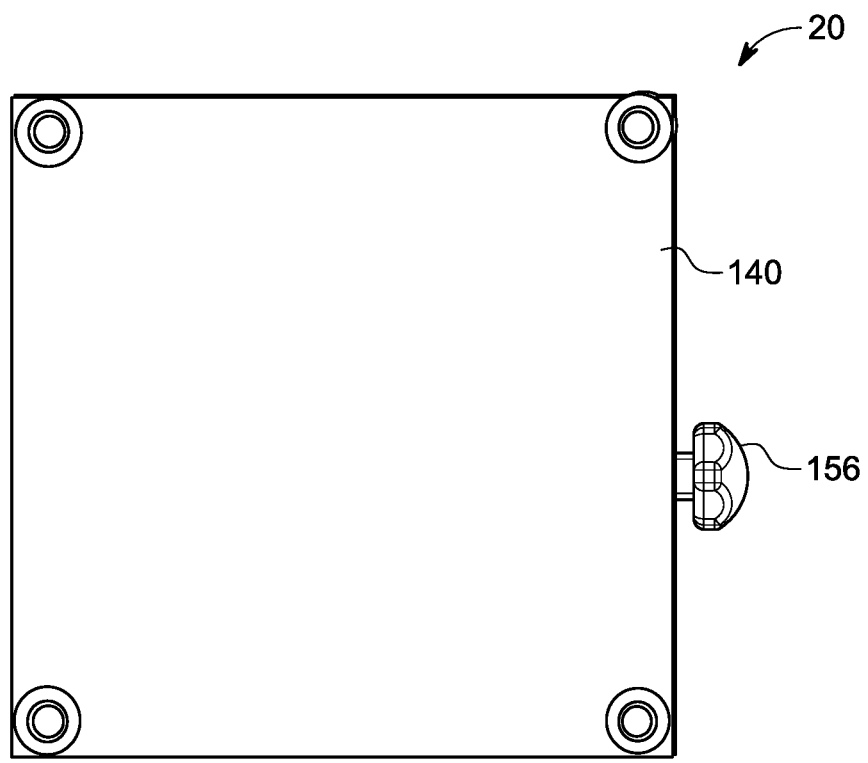
FIG. 7 is a bottom view of the loading system of FIG. 3.

Referring to FIG. 6, the set screw assembly 156 is threadably coupled to the second side wall 692 of the feeder housing 160. The set screw assembly 156 includes a threaded set pin 670 coupled to a handle 672. The set screw assembly 156 has a first operational position such that the threaded set pin 670 extends through the second side wall 692 and contacts the feeder plate 180 to hold the feeder plate 180 at a fixed position. Further, the set screw assembly 156 has a second operational position such that the threaded set pin 670 does not contact the feeder plate 180.

Referring to FIGS. 1-4, the feeder housing 160 is provided to hold the pusher plate 170, the feeder plate 180, and the ammunition case gauge 24 therein. The feeder housing 160 is further provided to receive the plurality of ammunition cartridges 22 through a top open end 710 thereof. The feeder housing 160 is coupled to a top surface 250 of the upper support plate 142. The feeder housing 160 has an interior region 706 (shown in FIG. 4) communicating with the top open end 710 thereof and a side opening 708 thereof.

The feeder housing 160 includes first, second, and third side walls 691, 692, 693 that are coupled to and extend upwardly from the upper support plate 142. The first and second side walls 691, 692 extend parallel to one another. The third side wall 693 is coupled to and between the first and second side walls 691, 692. The first, second, and third side walls 691, 692, 693 define the interior region 706 of the feeder housing 160.

Figure 3:
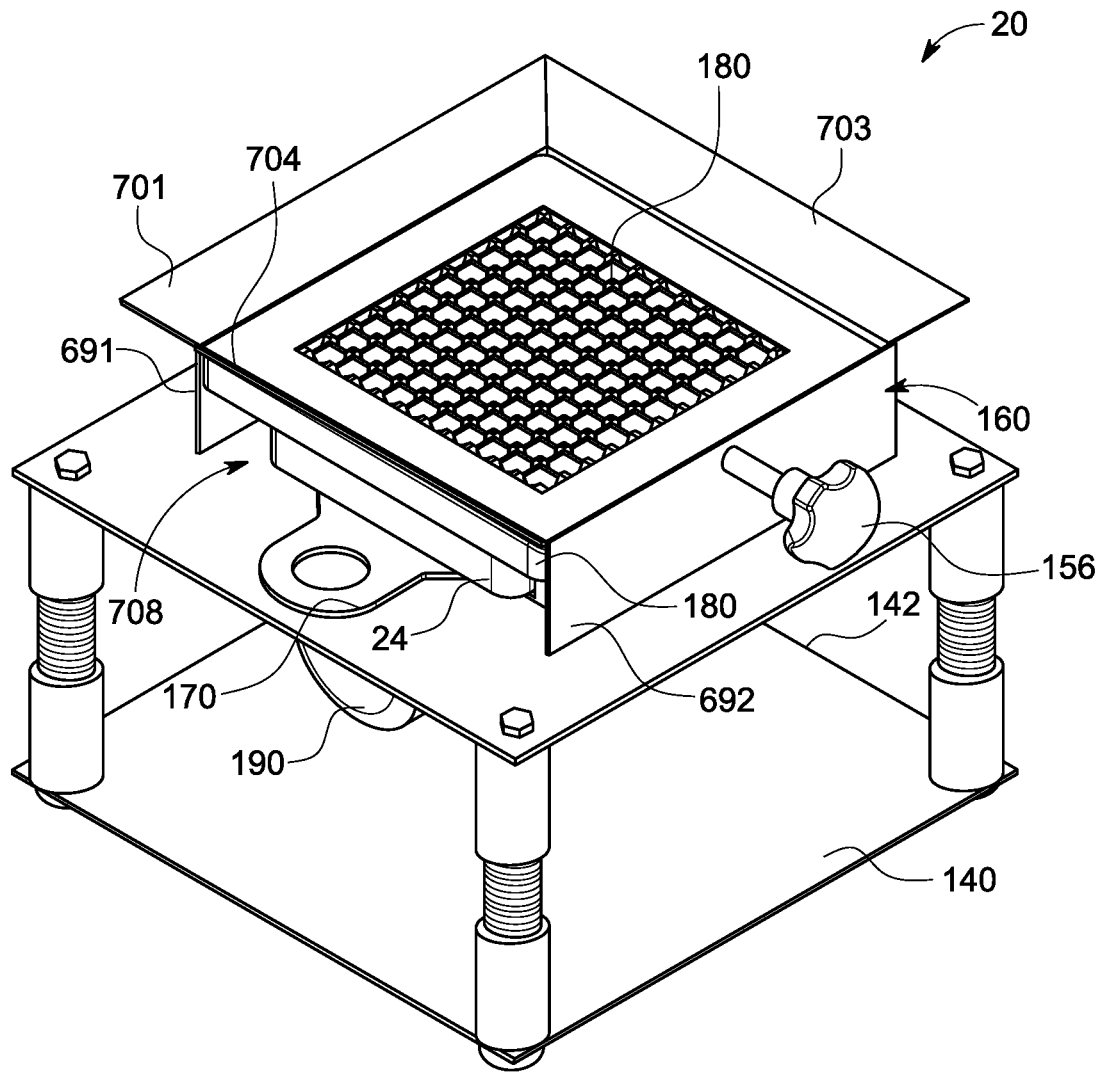
FIG. 3 is an isometric view of the loading system of FIG. 1 prior to the plurality of ammunition cartridges being received thereon.
Figure 4:
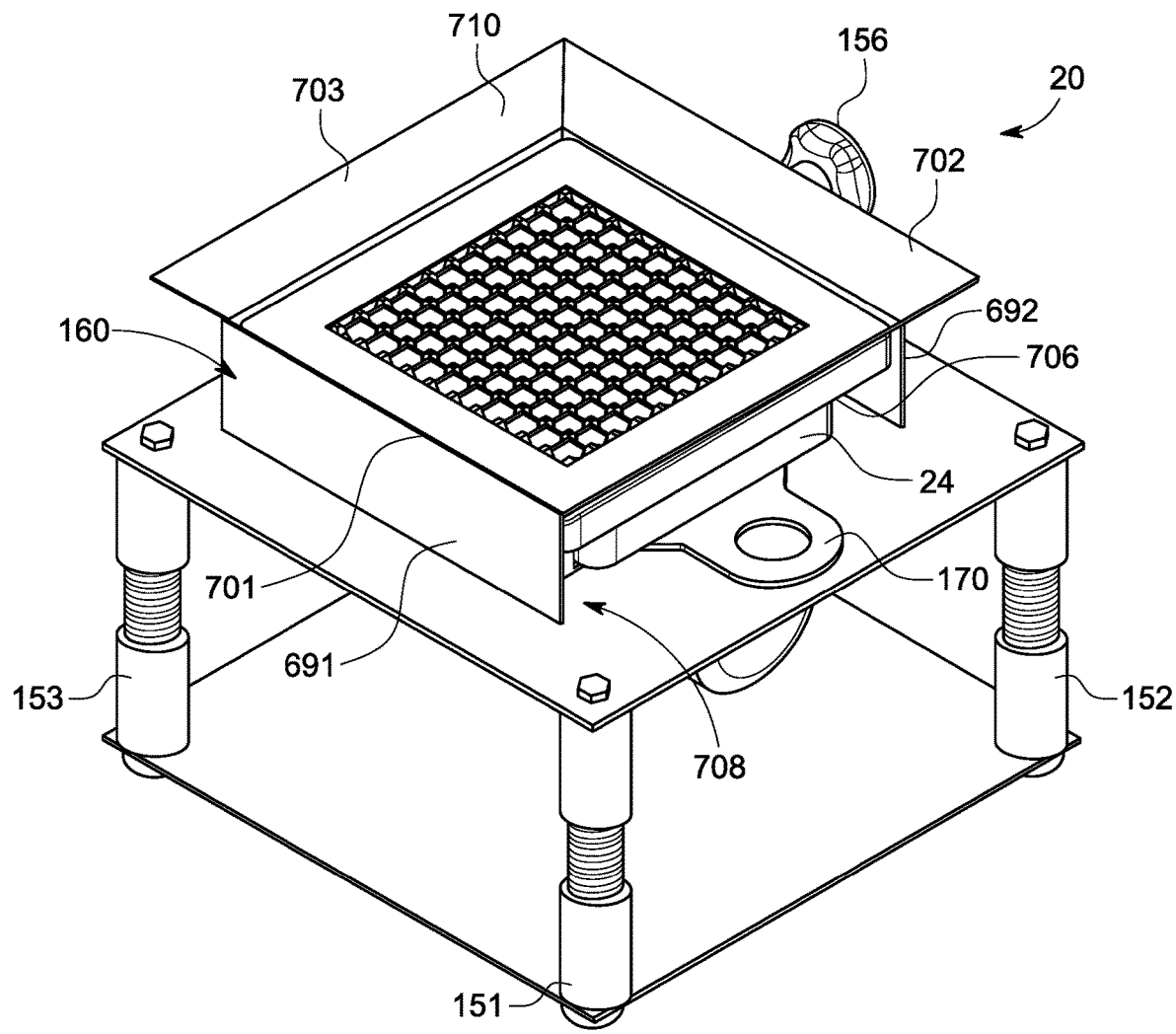
FIG. 4 is another isometric view of the loading system of FIG. 3.
Figure 5:
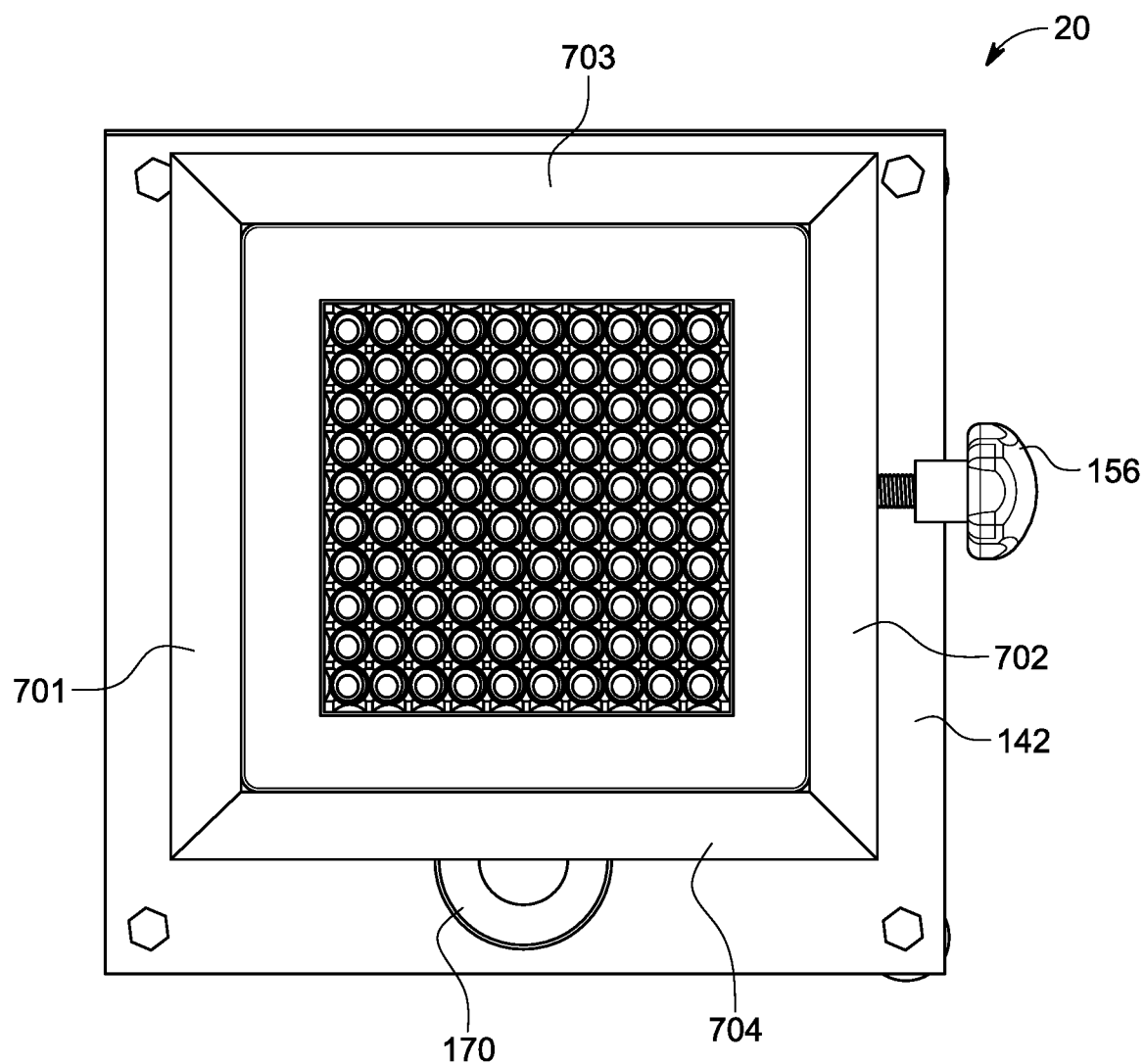
FIG. 5 is a top view of the loading system of FIG. 3.

Referring to FIGS. 3 and 4, the feeder housing 160 further includes first, second, third, fourth angled walls 701, 702, 703, 704. The first angled wall 701 is coupled and extends outwardly from the first side wall 691. The second angled wall 702 is coupled to and extends outwardly from the second side wall 692. The third angled wall 703 is coupled to and extends outwardly from the third side wall 693 (shown in FIG. 2). The fourth angled wall 704 is coupled to and between the first side wall 691 and the second side wall 692 such that the fourth angled wall 704 and the first and second side walls 691, 692 define the side opening 708 of the feeder housing 160. In an exemplary embodiment, the feeder housing 160 is constructed of a metal such as steel.

Referring to FIGS. 21-24, the pusher plate 170 is provided to hold the ammunition case gauge 24 (shown in FIG. 11) thereon. The pusher plate 107 includes a bottom wall 720, a first side wall 731, a second side wall 732, a third side wall 733, a handle portion 740, and a plurality of shafts 742.

The plurality of shafts 742 extend upwardly from the bottom wall 720. In an exemplary embodiment, the plurality of shafts 742 includes rows of shafts 761, 762, 763, 764, 765, 766, 767, 768, 769, 770. In particular, the plurality of shafts 742 extend upwardly from the bottom wall 720 such that the plurality of shafts 742 extend partially into the plurality of holes 44 of the ammunition case gauge 24 and hold the plurality of ammunition cartridges 22 in a desired position within the plurality of holes 44 to prevent more than one ammunition cartridge of the ammunition cartridges 22 from being fed into a respective hole of the plurality of holes 44.

The first, second, and third side walls 731, 732, 733 are coupled to and extend upwardly from the bottom wall 720. The first and second side walls 731, 732 extend parallel to one another. The third side wall 733 is coupled to and between the first and second side walls 731, 732. The first, second, and third side walls 731, 732, 733 and the bottom wall 720 define a region for receiving the ammunition case gauge 24 therein.

The handle portion 740 is integrally formed with and coupled to the bottom wall 720. The handle portion 740 has an aperture 750 extending therethrough.

Figure 11:
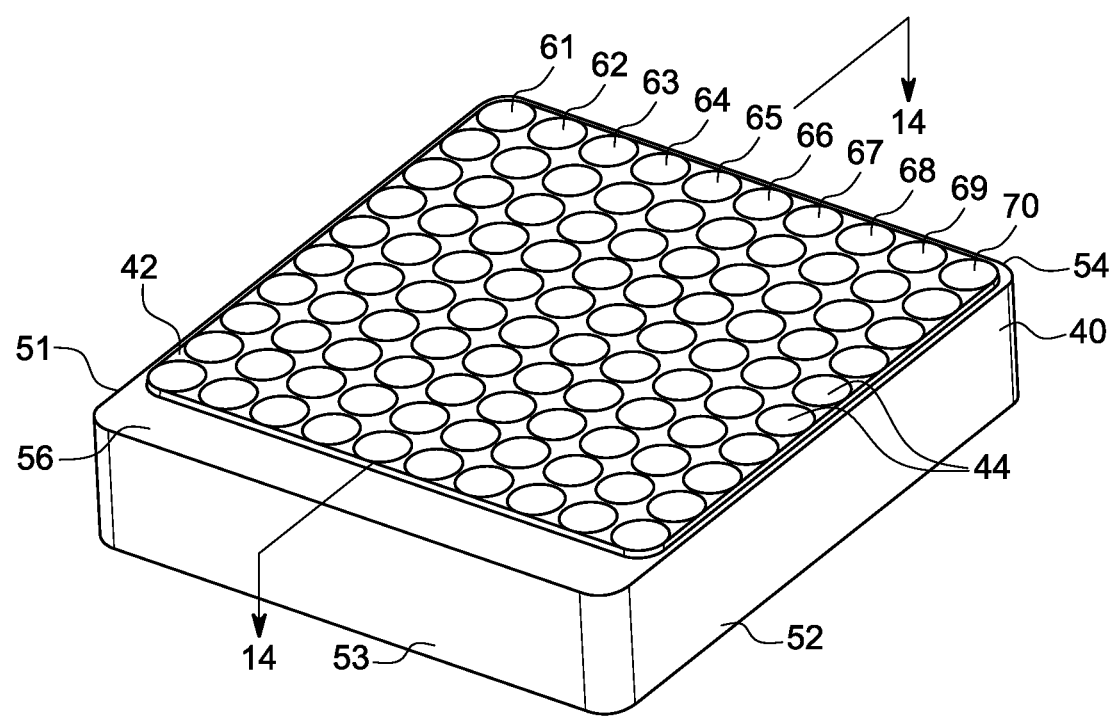
FIG. 11 is an isometric view of an ammunition case gauge.
Figure 21:
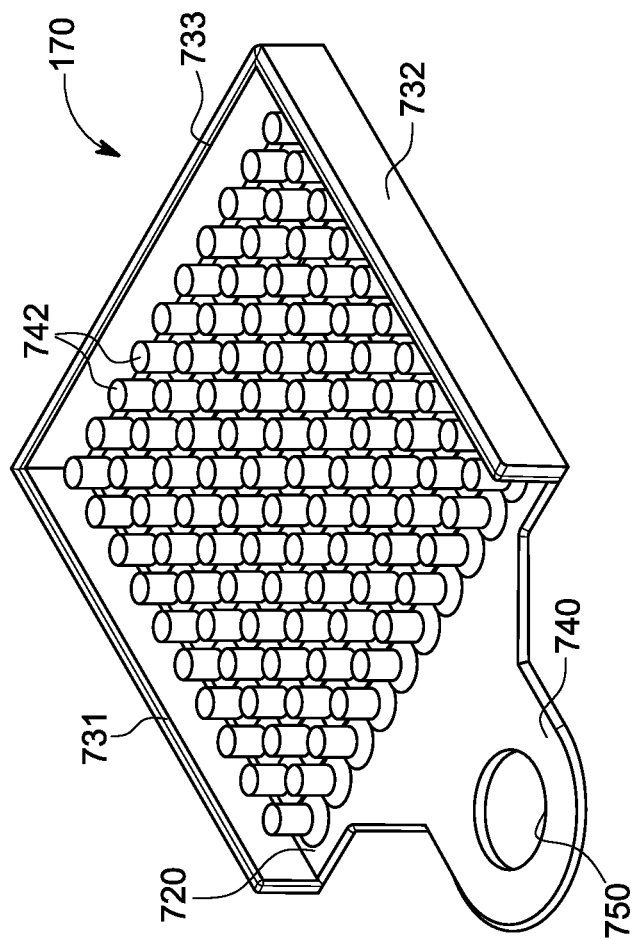
FIG. 21 is an isometric view of the pusher plate of FIG. 16.
Figure 22:
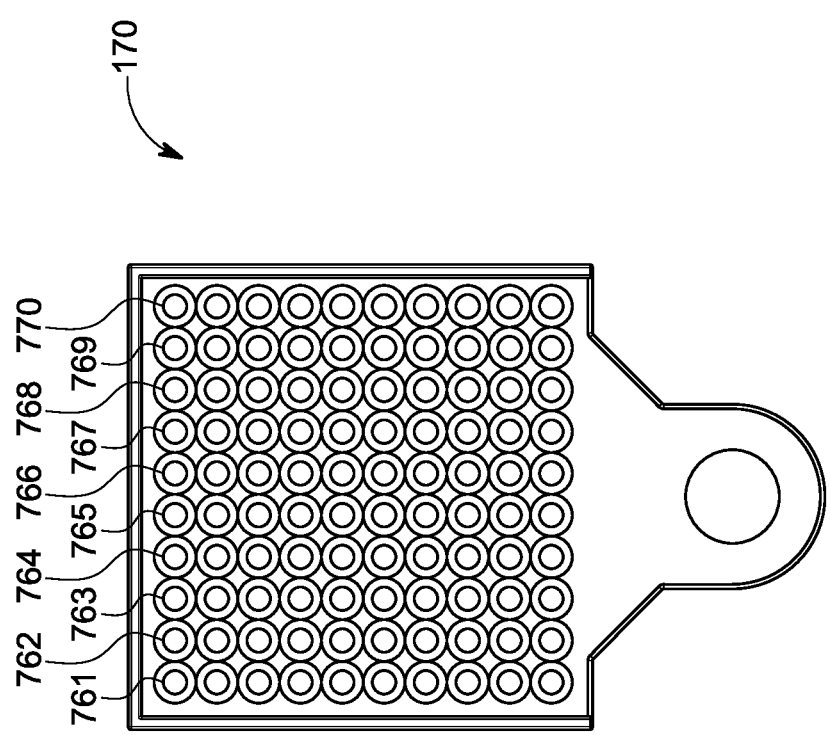
FIG. 22 is a top view of the pusher plate of FIG. 21.
Figure 23:
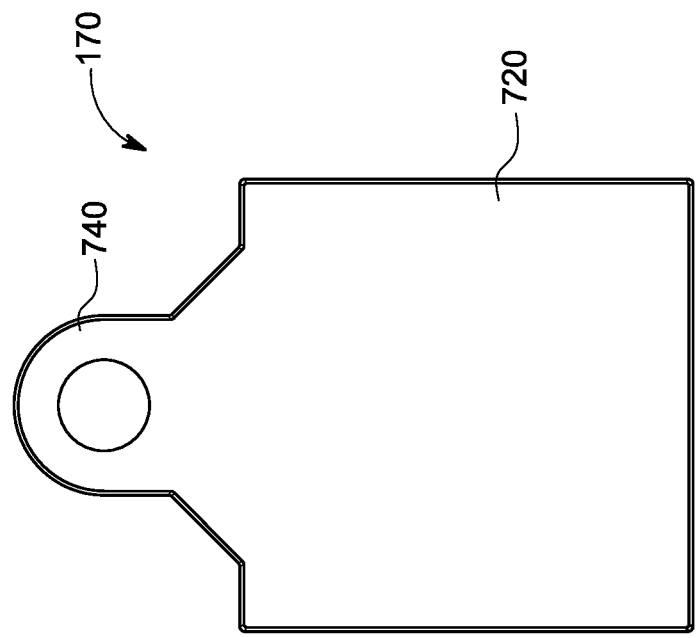
FIG. 23 is a front view of the pusher plate of FIG. 21.
Figure 24:
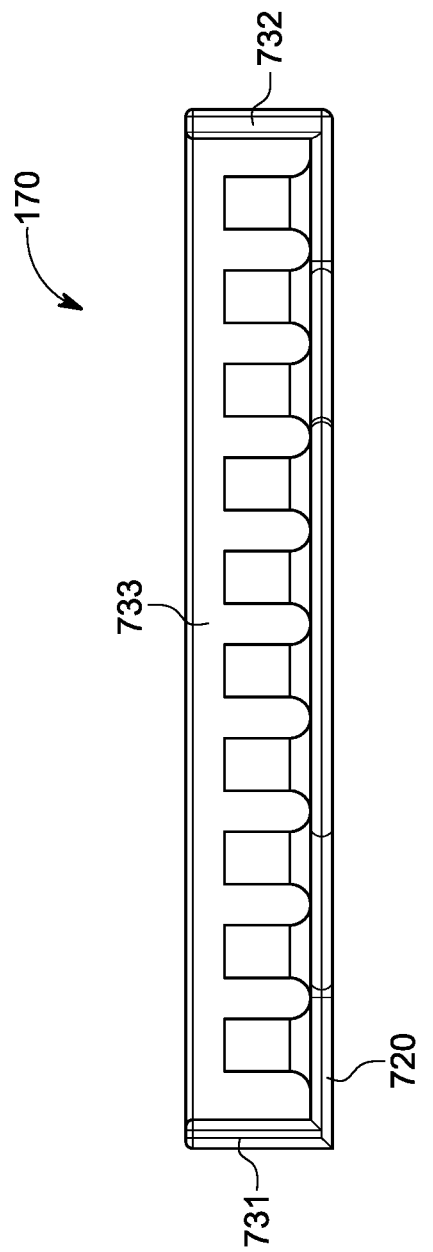
FIG. 24 is a bottom view of the pusher plate of FIG. 21.

Referring to FIGS. 11 and 21, the pusher plate 170 removably receives the ammunition case gauge 24 thereon such that the plurality of shafts 742 extend at least partially into the plurality of holes 44 of the ammunition case gauge 24. In an exemplary embodiment, the pusher plate 170 is constructed of plastic.

Referring to FIGS. 1, 16-19 and 25-31, the feeder plate 180 is configured to be disposed on the ammunition case gauge 24. Further, when the feeder plate 180, and the plurality of ammunition cartridges 22, and the pusher plate 170 are vibrated, the feeder plate 180 feeds the plurality of ammunition cartridges 22 through a plurality of apertures 808 thereof into corresponding holes in the ammunition case gauge 24.

Referring to FIGS. 25-29, the feeder plate 180 includes an inner rectangular-shaped plate portion 800, an outer rectangular ring-shaped plate portion 802, an upper surface 804, a bottom surface 806, and a plurality of apertures 808 extending therethrough. The outer rectangular ring-shaped plate portion 802 is integrally formed and coupled to the inner rectangular shaped plate portion 800 and surrounds the inner rectangular shaped plate portion 800.

Figure 27:
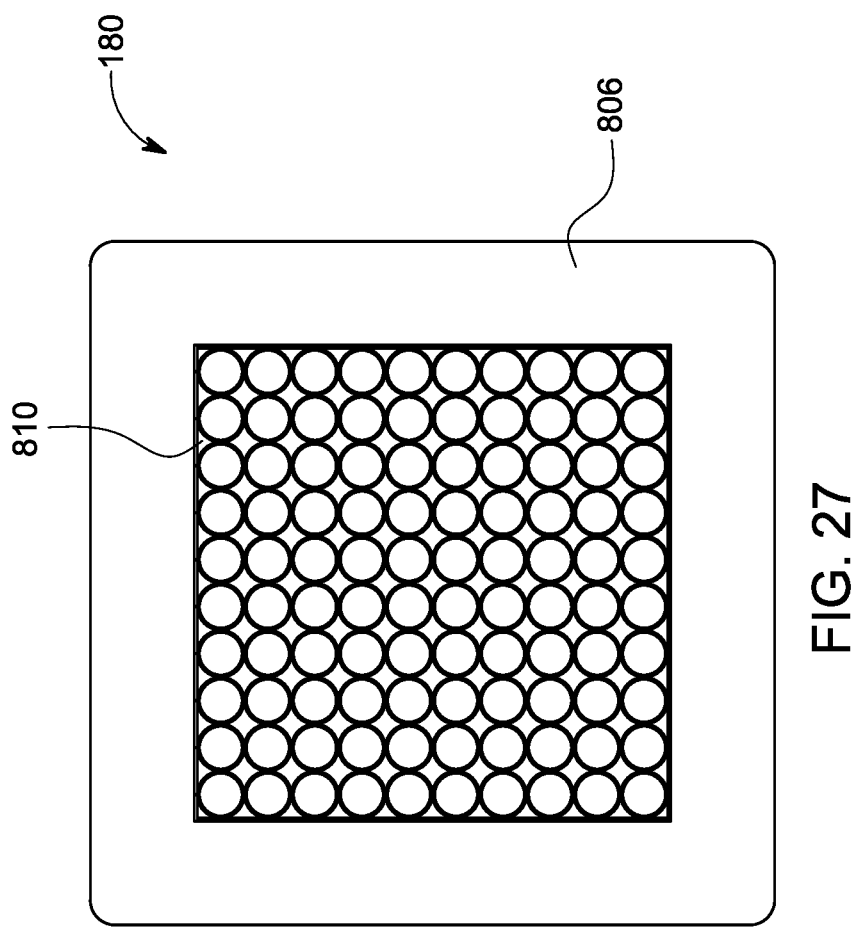
FIG. 27 is a bottom view of the feeder plate of FIG. 16.
Figure 28:
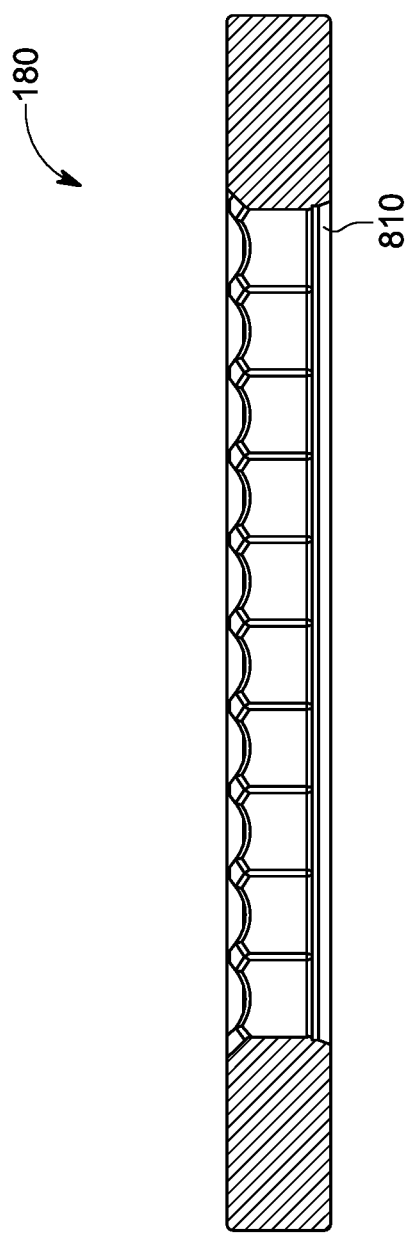
FIG. 28 is a cross-sectional view of the feeder plate of FIG. 25 taken along lines 28-28 in FIG. 25.
Figure 29:
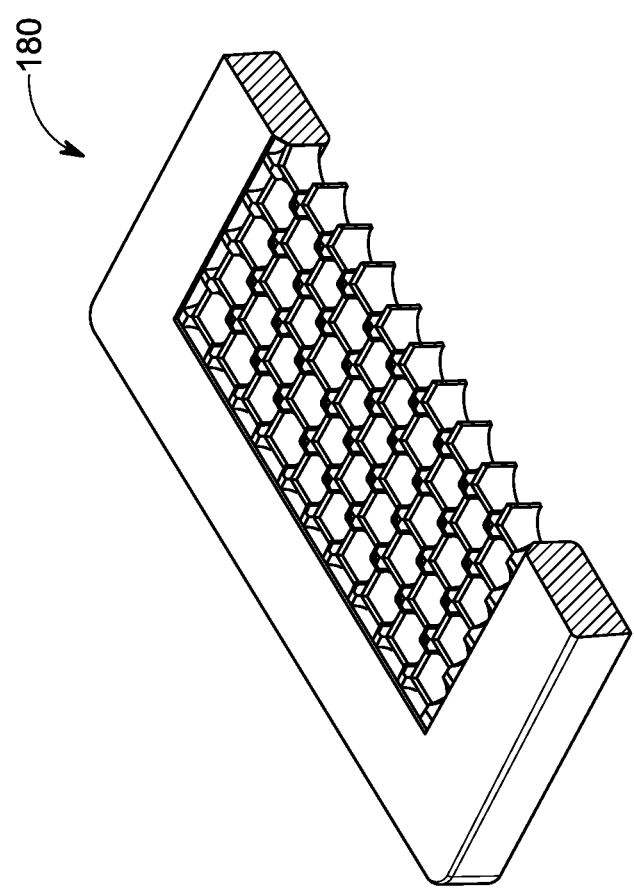
FIG. 29 is a partial isometric view of the feeder plate of FIG. 25.

Referring to FIGS. 11, 27 and 28, the inner rectangular-shaped plate portion 800 includes a rectangular-shaped groove 810 that extends from the bottom surface 806 into the inner rectangular-shaped plate portion 800. The rectangular-shaped groove 800 is sized and shaped to receive a top portion of the ammunition case gauge 24 therein.

Figure 25:
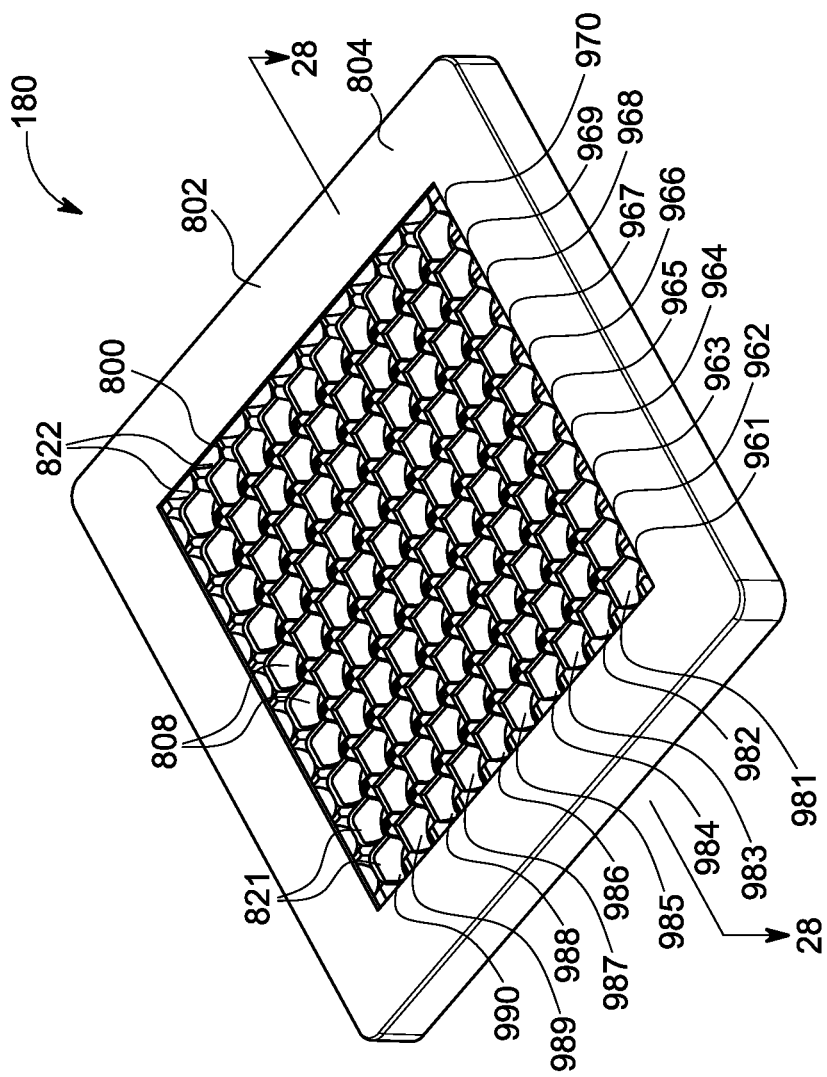
FIG. 25 is an isometric view of the feeder plate of FIG. 16.
Figure 30:
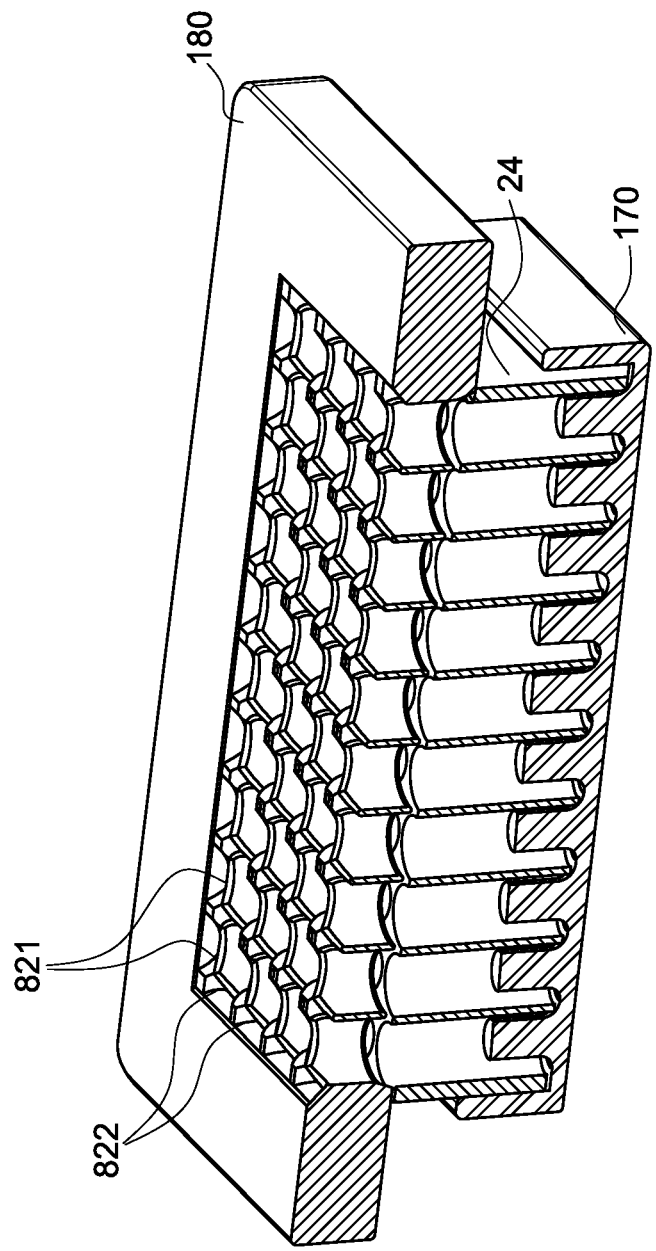
FIG. 30 is a partial view of the pusher plate, the feeder plate, and the ammunition case gauge of FIG. 16.
Figure 31:
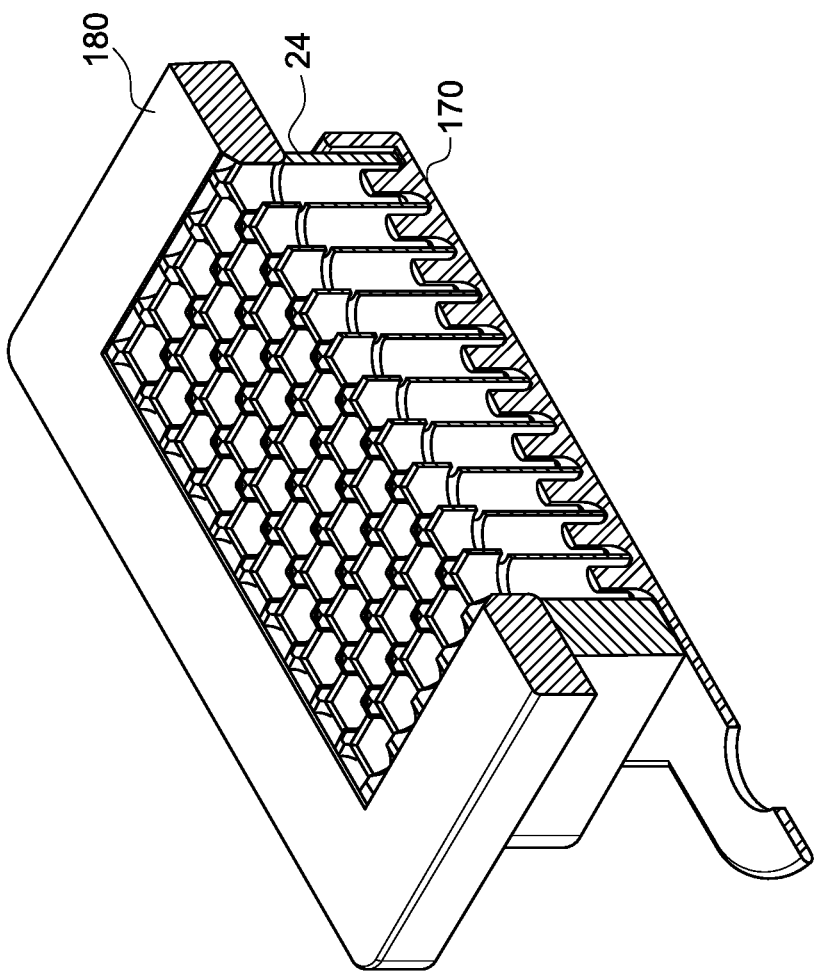
FIG. 31 is another partial view of the pusher plate, the feeder plate, and the ammunition case gauge of FIG. 16.
Figure 32:
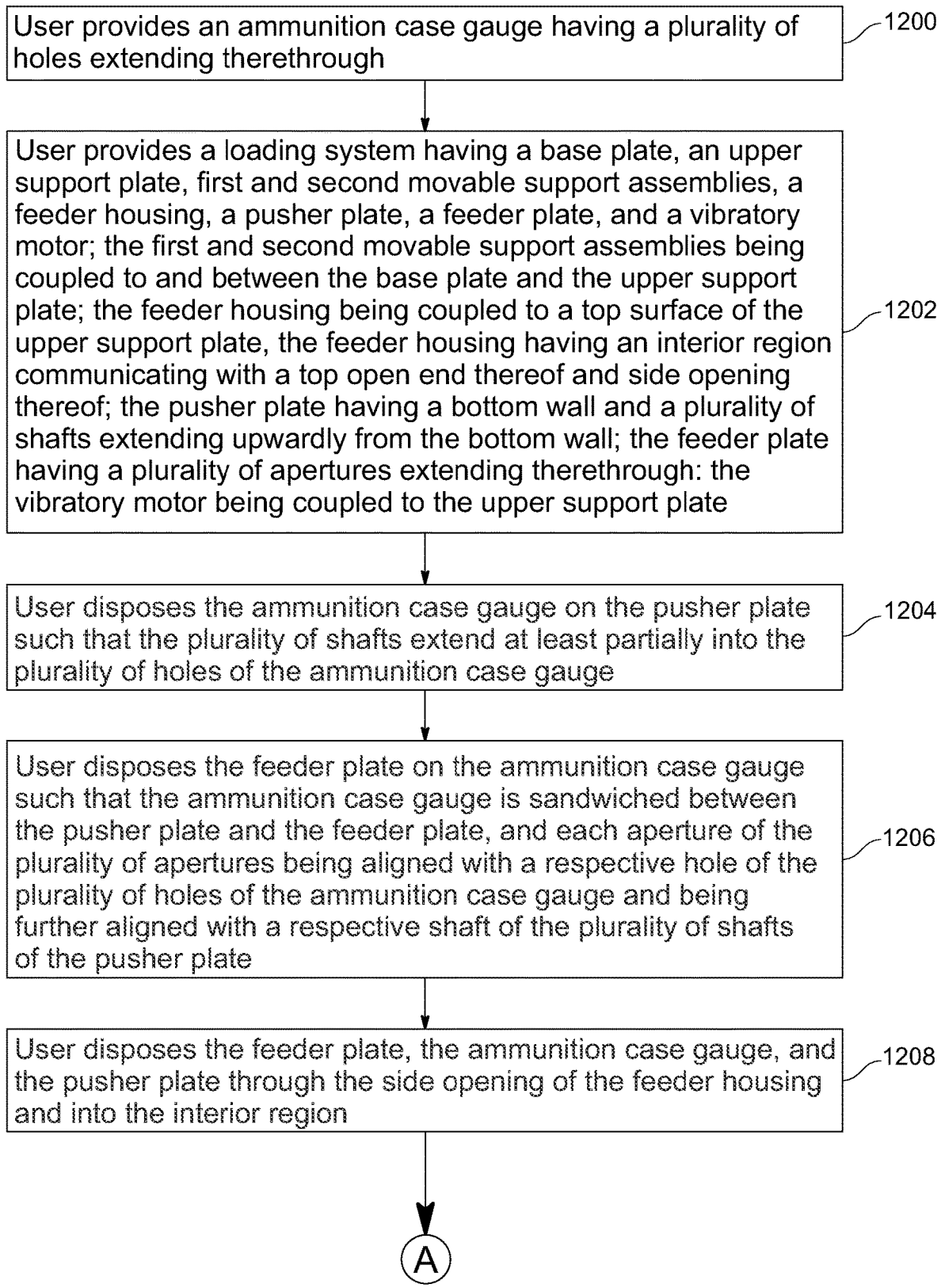
FIGS. 32-34 are a flowchart of a method for loading a plurality of ammunition cartridges into the ammunition case gauge in accordance with another exemplary embodiment.
Figure 33:
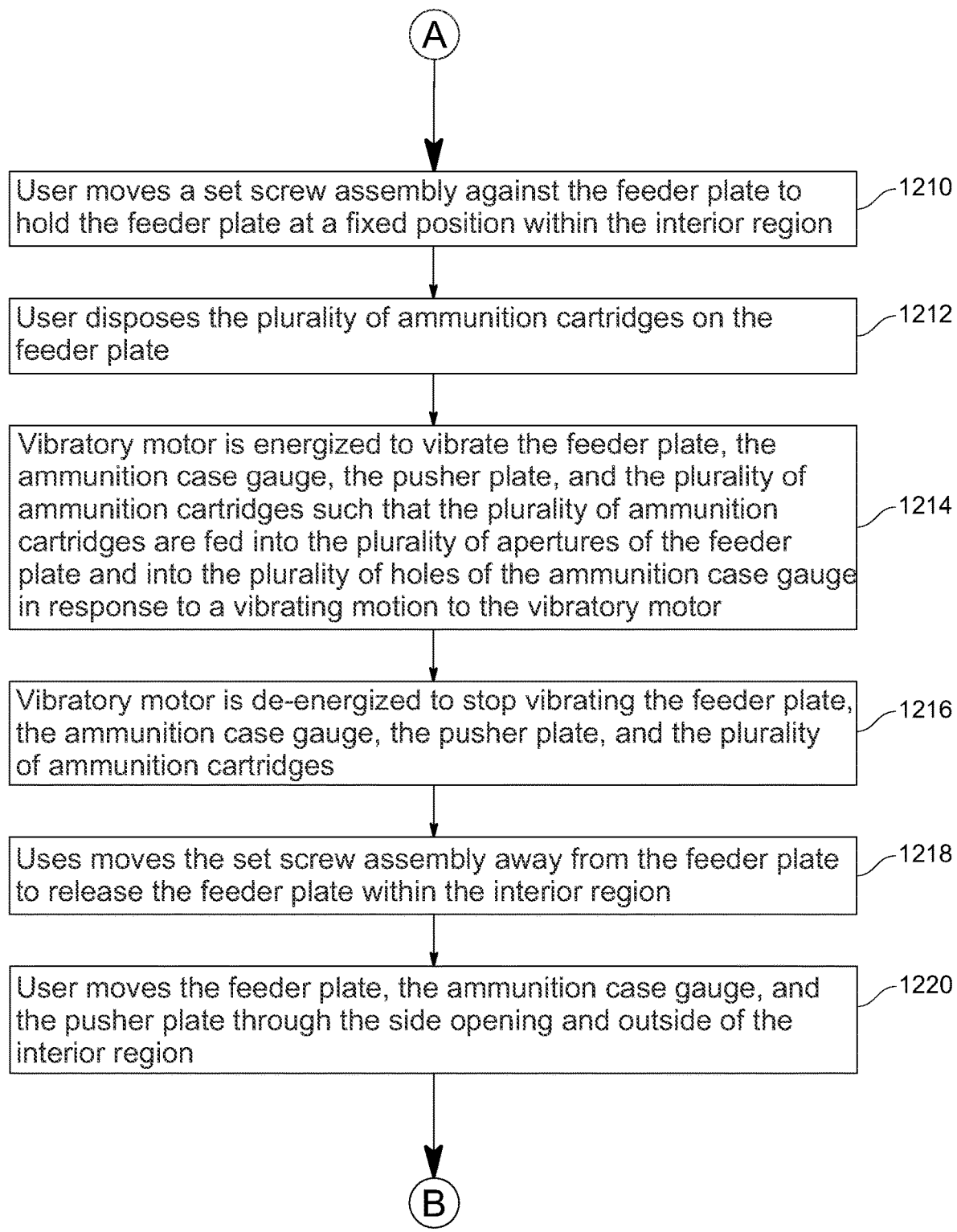
Figure 34:
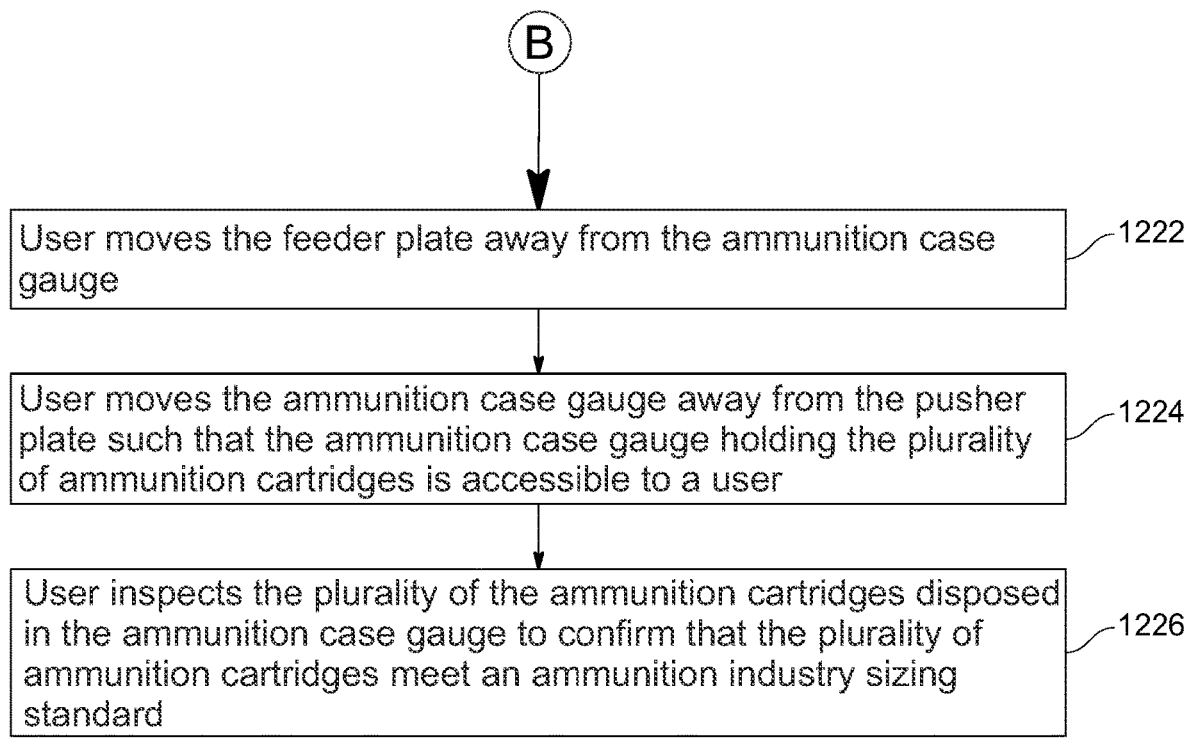

Referring to FIGS. 25, 30 and 31, the inner rectangular-shaped plate portion 800 has a first plurality of grooves 821 formed therein that extends from the upper surface 804 into the inner rectangular-shaped plate portion 800. The first plurality of grooves 821 extends in a first direction and are parallel and spaced apart from another. In an exemplary embodiment, the first plurality of grooves 821 includes rows of grooves 961, 962, 963, 964, 965, 966, 967, 968, 969, 970 extending in the first direction that are parallel and spaced apart from one another.

The inner rectangular-shaped plate portion 800 further includes a second plurality of grooves 822 formed therein that extends from the upper surface 804 into the inner rectangular-shaped plate portion 800. The second plurality of grooves 822 extend in a second direction and are parallel and spaced apart from another. The second direction is perpendicular to the first direction. Further, each aperture of the plurality of apertures 808 is centered at an intersection of a respective groove of the first plurality of grooves 821 and a respective groove of the second plurality of grooves 822. In an exemplary embodiment, the second plurality of grooves 822 includes rows of grooves 981, 982, 983, 984, 985, 986, 987, 988, 989, 990 extending in the second direction that are parallel and spaced apart from one another.

An advantage of using the first and second plurality of grooves 821, 822 is that the grooves 821, 822 form chamfered regions above each aperture of the plurality of apertures 808 of the feeder plate 180 to efficiently cause the plurality of ammunition cartridges 22 to drop into the plurality of apertures 808 of the feeder plate 180.

Figure 26:
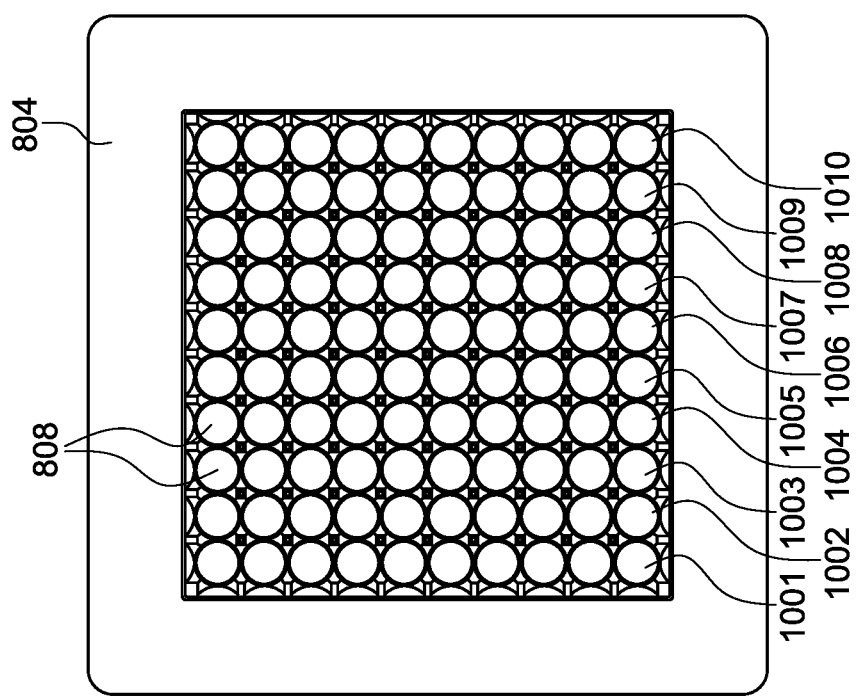
FIG. 26 is a top view of the feeder plate of FIG. 16.

Referring to FIG. 26, the plurality of apertures 808 in the feeder plate 180 includes rows of apertures 1001, 1002, 1003, 1004, 1005, 1006, 1007, 1008, 1009, 1010 extending in a first direction that are parallel and spaced apart from one another.

Referring to FIGS. 1, 30 and 31, the feeder plate 180 is disposed on the ammunition case gauge 24 such that the ammunition case gauge 24 is disposed between the pusher plate 170 and the feeder plate 180. Each aperture of the plurality of apertures 808 (shown in FIG. 25) of the feeder plate 180 is aligned with a respective hole of the plurality of holes 44 (shown in FIG. 11) of the ammunition case gauge 24 and are further aligned with a respective shaft of the plurality of shafts 742 (shown in FIG. 21) of the pusher plate 170. Referring to FIG. 4, the side opening 708 is sized to receive the pusher plate 170, the ammunition case gauge 24, and the feeder plate 180 therethrough such that the pusher plate 170, the ammunition case gauge 24, and the feeder plate 180 are disposed in the interior region 706.

Referring to FIGS. 1 and 6, the vibratory motor 190 is coupled to the upper support plate 142. When the vibratory motor 190 is energized, the vibratory motor 190 vibrates the upper support plate 142, the feeder housing 160, the feeder plate 180, the ammunition case gauge 24, and the pusher plate 170. In particular, when the vibratory motor 190 is energized, the vibratory motor vibrates the feeder plate 180, the ammunition case gauge 24, and the pusher plate 170 such that the plurality of ammunition cartridges disposed on the feeder plate 180 proximate to the top open end 710 of the feeder housing 160 are fed into the plurality of apertures 808 (shown in FIG. 25) of the feeder plate 180 and further into the plurality of holes 44 (shown in FIG. 11) of the ammunition case gauge 24. Alternately, when the vibratory motor 190 is de-energized, the vibratory motor 190 stops vibrating the upper support plate 142, the feeder housing 160, the feeder plate 180, the ammunition case gauge 24, and the pusher plate 170.

Referring to FIGS. 1, 11, 21, 25, and 32-34, a flowchart of a method for loading a plurality of ammunition cartridges 22 into the ammunition case gauge 24 in accordance with another exemplary embodiment will be explained.

At step 1200, a user provides an ammunition case gauge 24 (shown in FIG. 11) having a plurality of holes 44 extending therethrough. After step 1200, the method advances to step 1202.

At step 1202, the user provides a loading system 20 having a base plate 140, an upper support plate 142, first and second movable support assemblies 151, 152, a feeder housing 160, a pusher plate 170, a feeder plate 180, and a vibratory motor 190. The first and second movable support assemblies 151, 152 are coupled to and between the base plate 140 and the upper support plate 142. The feeder housing 160 is coupled to a top surface 250 of the upper support plate 142. The feeder housing 160 has an interior region 706 communicating with a top open end 710 thereof and a side opening 708 thereof. The pusher plate 170 has a bottom wall 720 and a plurality of shafts 742 extending upwardly from the bottom wall 720. The feeder plate 180 has a plurality of apertures 808 extending therethrough. The vibratory motor 190 is coupled to the upper support plate 142. After step 1202, the method advances to step 1204.

At step 1204, the user disposes the ammunition case gauge 24 on the pusher plate 170 such that the plurality of shafts 742 extend at least partially into the plurality of holes 44 of the ammunition case gauge 24. After step 1204, the method advances to step 1206.

At step 1206, the user disposes the feeder plate 180 on the ammunition case gauge 24 such that the ammunition case gauge 24 is disposed between the pusher plate 170 and the feeder plate 180, and each aperture of the plurality of apertures 808 being aligned with a respective hole of the plurality of holes 44 of the ammunition case gauge 24 and being further aligned with a respective shaft of the plurality of shafts 742 of the pusher plate 170. After step 1206, the method advances to step 1208.

At step 1208, the user disposes the feeder plate 180, the ammunition case gauge 24, and the pusher plate 170 through the side opening 708 of the feeder housing 160 and into the interior region 706. After step 1208, the method advances to step 1210.

At step 1210, the user moves a set screw assembly 156 against the feeder plate 180 to hold the feeder plate 180 at a fixed position within the interior region 706. At step 1210, the method advances to step 1212.

At step 1212, the user disposes the plurality of ammunition cartridges 22 on the feeder plate 180. After step 1212, the method advances to step 1214.

At step 1214, the vibratory motor 190 is energized to vibrate the feeder plate 180, the ammunition case gauge 24, the pusher plate 170, and the plurality of ammunition cartridges 22 such that the plurality of ammunition cartridges 22 are fed into the plurality of apertures 808 of the feeder plate 180 and into the plurality of holes 44 of the ammunition case gauge 24 in response to a vibrating motion of the vibratory motor 190. After step 1214, the method advances to step 1216.

At step 1216, the vibratory motor 190 is de-energized to stop vibrating the feeder plate 180, the ammunition case gauge 24, the pusher plate 170, and the plurality of ammunition cartridges 22. After step 1216, the method advances to step 1218.

At step 1218, the user moves the set screw assembly 156 away from the feeder plate 180 to release the feeder plate 180 within the interior region 706. After step 1218, the method advances to step 1220.

At step 1220, the user moves the feeder plate 180, the ammunition case gauge 24, and the pusher plate 170 through the side opening 708 and outside of the interior region 706. After step 1220, the method advances to step 1222.

At step 1222, the user moves the feeder plate 180 away from the ammunition case gauge 24. After step 1222, the method advances to step 1224.

At step 1224, the user moves the ammunition case gauge 24 away from the pusher plate 170 such that the ammunition case gauge 24 holding the plurality of ammunition cartridges 22 is accessible to a user.

At step 1226, the user inspects the plurality of ammunition cartridges 22 disposed in the ammunition case gauge 24 to confirm that the plurality of ammunition cartridges 22 meet an ammunition industry sizing standard.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description. Also, the words "fed", "displaced", "moved" and "dropped" can be used interchangeably herein.

What is claimed is:

1. A loading system for an ammunition case gauge, the ammunition case gauge having a plurality of holes extending therethrough, the loading system comprising:
   a base plate;
   an upper support plate;
   first and second movable support assemblies being coupled to and between the base plate and the upper support plate;
   a feeder housing being coupled to the upper support plate, the feeder housing having an interior region communicating with a top open end thereof and a side opening thereof;
   a pusher plate having a bottom wall and a plurality of shafts extending upwardly from the bottom wall, the pusher plate removably receiving the ammunition case gauge thereon such that the plurality of shafts extend at least partially into the plurality of holes of the ammunition case gauge;
   a feeder plate having a plurality of apertures extending therethrough, the feeder plate being disposed on the ammunition case gauge such that the ammunition case gauge is disposed between the pusher plate and the feeder plate, each aperture of the plurality of apertures being aligned with a respective hole of the plurality of holes of the ammunition case gauge and being further aligned with a respective shaft of the plurality of shafts of the pusher plate; the side opening being sized to receive the pusher plate, the ammunition case gauge, and the feeder plate therethrough such that the pusher plate, the ammunition case gauge, and the feeder plate are disposed in the interior region of the feeder housing; and
   a vibratory motor being coupled to the upper support plate such that the vibratory motor vibrates the feeder plate, the ammunition case gauge, and the pusher plate.

2. The loading system of claim 1, wherein:
   the vibratory motor vibrates the feeder plate, the ammunition case gauge, and the pusher plate such that ammunition cartridges disposed on the feeder plate proximate to the top open end of the feeder housing are fed into the plurality of apertures of the feeder plate and further into the plurality of holes of the ammunition case gauge.

3. The loading system of claim 1, further comprising:
   third and fourth movable support assemblies being coupled to and between the base plate and the upper support plate.

4. The loading system of claim 1, wherein:
   the first movable support assembly having first and second bolts, first and second nuts, first and second support members, and a spring;
   the first support member having a top end and a bottom end, a spring receiving aperture extending from the bottom end thereof into the first support member, and a bolt receiving aperture extending from the top end thereof into the first support member and communicating with the spring receiving aperture thereof;
   the first bolt extending through the upper support plate, and the bolt receiving aperture of the first support member, and into the spring receiving aperture of the first support member; the first nut being disposed in the spring receiving aperture of the first support member and being threadably coupled to the first bolt;
   the second support member having a top end and a bottom end, a spring receiving aperture extending from the top end thereof into the second support member, and a bolt receiving aperture extending from the bottom end thereof into the second support member and communicating with the spring receiving aperture thereof;
   the second bolt extending through the base plate, and the bolt receiving aperture of the second support member, and into the spring receiving aperture of the second support member; the second nut being disposed in the spring receiving aperture of the second support member and being threadably coupled to the second bolt; and
   the spring being disposed in the spring receiving aperture of the first support member and the spring receiving aperture of the second support member such that the first and second support members are spaced apart from one another.

5. The loading system of claim 1, wherein:
   the feeder housing having first, second, and third side walls being coupled to and extending upwardly from the upper support plate; the first and second side walls extending parallel to one another, the third side wall being coupled to and between the first and second side walls; the first, second, and third side walls defining the interior region of the feeder housing; and
   first, second, third, fourth angled walls; the first angled wall being coupled and extending outwardly from the first side wall, the second angled wall being coupled to and extending outwardly from the second side wall, the third angled wall being coupled to and extending outwardly from the third side wall, the fourth angled wall being coupled to and between the first side wall and the second side wall such that the fourth angled wall and the first and second side walls define the side opening of the feeder housing.

6. The loading system of claim 1, wherein:
   the pusher plate further includes first, second, and third side walls and a handle portion;
   the first, second, and third side walls being coupled to and extending upwardly from the bottom wall, the first and second side walls extending parallel to one another, the third side wall being coupled to and between the first and second side walls; the first, second, and third side walls and the bottom wall defining a region for receiving the ammunition case gauge therein;
   the handle portion being integrally formed with and coupled to the bottom wall, the handle portion having an aperture extending therethrough; and
   the plurality of shafts extending upwardly from the bottom wall such that the plurality of shafts extend partially into the plurality of holes of the ammunition case gauge and hold ammunition cartridges in a desired position within the plurality of holes to prevent more than one ammunition cartridge of the ammunition cartridges from being fed into a respective hole of the plurality of holes.

7. The loading system of claim 1, wherein:
   the feeder plate having an inner rectangular-shaped plate portion and an outer rectangular ring-shaped plate portion that is coupled to and surrounds the inner rectangular-shaped plate portion; the feeder plate further having an upper surface and a bottom surface;

the inner rectangular-shaped plate portion having a first plurality of grooves formed therein that extends from the upper surface into the inner rectangular-shaped plate portion, the first plurality of grooves extending in a first direction and being parallel and spaced apart from another;

the inner rectangular-shaped plate portion further having a second plurality of grooves formed therein that extends from the upper surface into the inner rectangular-shaped plate portion, the second plurality of grooves extending in a second direction and being parallel and spaced apart from another; the second direction being perpendicular to the first direction; and each aperture of the plurality of apertures of the feeder plate being centered at an intersection of a respective groove of the first plurality of grooves and a respective groove of the second plurality of grooves.

8. The loading system of claim 7, wherein:

the inner rectangular-shaped plate portion having a rectangular-shaped groove that extends from the bottom surface into the inner rectangular-shaped plate portion, the rectangular-shaped groove being sized and shaped to receive a top portion of the ammunition case gauge therein.

9. The loading system of claim 1, wherein:

the pusher plate is constructed of plastic, and the feeder plate is constructed of plastic.

10. A method for loading a plurality of ammunition cartridges into an ammunition case gauge, the ammunition case gauge having a plurality of holes extending therethrough, comprising:

providing a loading system having a base plate, an upper support plate, first and second movable support assemblies, a feeder housing, a pusher plate, a feeder plate, and a vibratory motor; the first and second movable support assemblies being coupled to and between the base plate and the upper support plate; the feeder housing being coupled to the upper support plate, the feeder housing having an interior region communicating with a top open end thereof and a side opening thereof; the pusher plate having a bottom wall and a plurality of shafts extending upwardly from the bottom wall; the feeder plate having a plurality of apertures extending therethrough; the vibratory motor being coupled to the upper support plate;

disposing the ammunition case gauge on the pusher plate such that the plurality of shafts extend at least partially into the plurality of holes of the ammunition case gauge;

disposing the feeder plate on the ammunition case gauge such that the ammunition case gauge is disposed between the pusher plate and the feeder plate, and each aperture of the plurality of apertures being aligned with a respective hole of the plurality of holes of the ammunition case gauge and being further aligned with a respective shaft of the plurality of shafts of the pusher plate;

disposing the feeder plate, the ammunition case gauge, and the pusher plate through the side opening of the feeder housing and into the interior region;

disposing the plurality of ammunition cartridges on the feeder plate; and vibrating the feeder plate, the ammunition case gauge, the pusher plate, and the plurality of ammunition cartridges utilizing the vibratory motor such that the plurality of ammunition cartridges are fed into the plurality of apertures of the feeder plate and into the plurality of holes of the ammunition case gauge in response to a vibrating motion of the vibratory motor.

11. The method of claim 10, further comprising:

moving a set screw assembly against the feeder plate to hold the feeder plate at a fixed position within the interior region.

12. The method of claim 11, further comprising:

moving the set screw assembly away from the feeder plate to release the feeder plate within the interior region, after the plurality of ammunition cartridges are in the plurality of holes of the ammunition case gauge.

13. The method of claim 12, further comprising:

moving the feeder plate, the ammunition case gauge, and the pusher plate through the side opening and outside of the interior region;

moving the feeder plate away from the ammunition case gauge; and moving the ammunition case gauge away from the pusher plate such that the ammunition case gauge holding the plurality of ammunition cartridges is accessible to a user.

* * * * *